US012566129B2

(12) United States Patent
Yamada et al.

(10) Patent No.: US 12,566,129 B2
(45) Date of Patent: Mar. 3, 2026

(54) SPECTROSCOPIC MEASUREMENT METHOD

(71) Applicant: Ushio Denki Kabushiki Kaisha, Tokyo (JP)

(72) Inventors: Go Yamada, Tokyo (JP); Kazuki Shinoyama, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 217 days.

(21) Appl. No.: 18/245,810

(22) PCT Filed: Aug. 5, 2021

(86) PCT No.: PCT/JP2021/029139
§ 371 (c)(1),
(2) Date: Mar. 17, 2023

(87) PCT Pub. No.: WO2022/059379
PCT Pub. Date: Mar. 24, 2022

(65) Prior Publication Data
US 2024/0027332 A1      Jan. 25, 2024

(30) Foreign Application Priority Data

Sep. 17, 2020      (JP) ................................. 2020-156794

(51) Int. Cl.
*G01N 21/31*          (2006.01)
*G01J 3/02*           (2006.01)
(Continued)

(52) U.S. Cl.
CPC ........... *G01N 21/31* (2013.01); *G01J 3/0218* (2013.01); *G01J 3/027* (2013.01); *G01J 3/10* (2013.01);
(Continued)

(58) Field of Classification Search
CPC .... G01N 21/31; G01N 21/3563; G01N 21/85; G01N 21/9508; G01N 2021/1789;
(Continued)

(56) References Cited

U.S. PATENT DOCUMENTS 4,768,853 A * 9/1988 Bhagavatula .... H04B 10/25133
                                                   385/124
9,816,921 B2 * 11/2017 Kumagai ................... G01J 3/10
(Continued)

FOREIGN PATENT DOCUMENTS

JP        S63-043110 A      2/1988
JP        S6343110 A  *  2/1988  ............... G02B 6/28
(Continued)

OTHER PUBLICATIONS

Yukihiro Ozaki, "Near-Infrared Spectral Analysis", Kodansha Ltd., Mar. 23, 2015, pp. 59 to 75.
(Continued)

*Primary Examiner* — Michelle M Iacoletti
*Assistant Examiner* — Noah J. Haney
(74) *Attorney, Agent, or Firm* — Studebaker Brackett PLLC

(57)                    ABSTRACT

Pulsed light in which an elapsed time in a pulse and a wavelength of light correspond to each other on a one-to-one basis is emitted from a pulsed light source and radiated to a product multiple times, and a plurality of beams of the pulsed light transmitted through the product is incident on a light receiver. An output of the light receiver is digitized by an AD converter, values at times regarded as having the same wavelength in beams of the pulsed light are integrated by an FPGA as an integration unit, and then the integrated value is input to a calculator, an absorption spectrum is (Continued)

calculated by a measurement program, and a quality determination program quantifies a specific component to determine quality of a product.

21 Claims, 14 Drawing Sheets

(51) Int. Cl.

| | |
|---|---|
| *G01J 3/10* | (2006.01) |
| *G01J 3/28* | (2006.01) |
| *G01J 3/32* | (2006.01) |
| *G01N 21/17* | (2006.01) |
| *G01N 21/3563* | (2014.01) |
| *G01N 21/84* | (2006.01) |
| *G01N 21/85* | (2006.01) |
| *G01N 21/95* | (2006.01) |
| *G02F 1/35* | (2006.01) |

(52) U.S. Cl.
CPC .............. *G01J 3/2889* (2013.01); *G01J 3/32* (2013.01); *G01N 21/3563* (2013.01); *G01J 2003/284* (2013.01); *G01N 2021/1789* (2013.01); *G01N 2021/8411* (2013.01); *G01N 21/85* (2013.01); *G01N 21/9508* (2013.01); *G01N 2201/06113* (2013.01); *G01N 2201/0696* (2013.01); *G01N 2201/0893* (2013.01); *G01N 2201/1293* (2013.01); *G02F 1/353* (2013.01)

(58) Field of Classification Search
CPC . G01N 2021/8411; G01N 2201/06113; G01N 2201/0696; G01N 2201/0893; G01N 2201/1293; G01J 3/0218; G01J 3/027; G01J 3/10; G01J 3/2889; G01J 3/32; G01J 2003/284; G02F 1/353
USPC ......................................................... 356/326
See application file for complete search history.

(56) References Cited

U.S. PATENT DOCUMENTS

| | | | | |
|---|---|---|---|---|
| 2003/0043451 A1* | 3/2003 | Kato | ........................ | G02F 1/353 |
| | | | | 359/326 |
| 2004/0207850 A1* | 10/2004 | Kwak | .................. | G01N 21/636 |
| | | | | 356/432 |
| 2005/0225752 A1* | 10/2005 | Takai | ................. | G01N 21/4795 |
| | | | | 356/237.1 |
| 2009/0323735 A1* | 12/2009 | Kuksenkov | ............. | H01S 3/067 |
| | | | | 385/124 |
| 2010/0309480 A1 | 12/2010 | Furusawa et al. | | |
| 2013/0208275 A1* | 8/2013 | Ikeda | ................... | G01N 21/718 |
| | | | | 356/318 |
| 2015/0085281 A1* | 3/2015 | Ikeda | ................... | G01N 21/718 |
| | | | | 356/318 |
| 2015/0355083 A1* | 12/2015 | Marbach | ............ | G01N 21/3563 |
| | | | | 356/402 |
| 2017/0059403 A1 | 3/2017 | Froehlich et al. | | |
| 2019/0011639 A1* | 1/2019 | Abediasl | ............... | H01S 3/2391 |
| 2020/0166406 A1 | 5/2020 | Ota et al. | | |
| 2020/0363265 A1* | 11/2020 | Okada | ................... | G01J 3/0205 |
| 2021/0356323 A1 | 11/2021 | Nagashima et al. | | |
| 2022/0187126 A1 | 6/2022 | Yokoyama | | |

FOREIGN PATENT DOCUMENTS

| | | | | | |
|---|---|---|---|---|---|
| JP | H09-15661 A | | 1/1997 | | |
| JP | 2009273550 A | * | 11/2009 | ......... | G01B 9/02004 |
| JP | 2010-197157 A | | 9/2010 | | |
| JP | 2013-205390 A | | 10/2013 | | |
| JP | 2017-049253 A | | 3/2017 | | |
| WO | WO-2013046861 A1 | * | 4/2013 | ............. | G01J 3/021 |
| WO | WO-2018225799 A1 | * | 12/2018 | ............. | G01J 3/433 |
| WO | 2020/075440 A1 | | 4/2020 | | |
| WO | 2020/075442 A1 | | 4/2020 | | |
| WO | 2020/196692 A1 | | 10/2020 | | |

OTHER PUBLICATIONS

International Search Report issued in PCT/JP2021/029139; mailed Nov. 2, 2021.
International Preliminary Report on Patentability and Written Opinion issued in PCT/JP2021/029139; issued Mar. 21, 2023.
The extended European search report issued by the European Patent Office on Jan. 26, 2024, which corresponds to European Patent Application No. 21869066.7-1020 and is related to U.S. Appl. No. 18/245,810.
"Notice of Reasons for Refusal" Office Action issued in JP 2020-156794; mailed by the Japanese Patent Office on Jun. 4, 2024.
"Notice of Reasons for Refusal" Office Action issued in JP 2020-156794; mailed by the Japanese Patent Office on Nov. 19, 2024.
An Office Action mailed by China National Intellectual Property Administration on Nov. 27, 2025, which corresponds to Chinese Patent Application No. 202180055471.0 and is related to U.S. Appl. No. 18/245,810; with English language translation.

* cited by examiner

FIG. 3

| TIME IN PULS | WAVELENGTH | REFERENCE SPECTRAL INTENSITY | MEASUREMENT VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| . | . | . | . | . |
| . | . | . | . | . |
| . | . | . | . | . |
| . | . | . | . | . |
| . | . | . | . | . |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

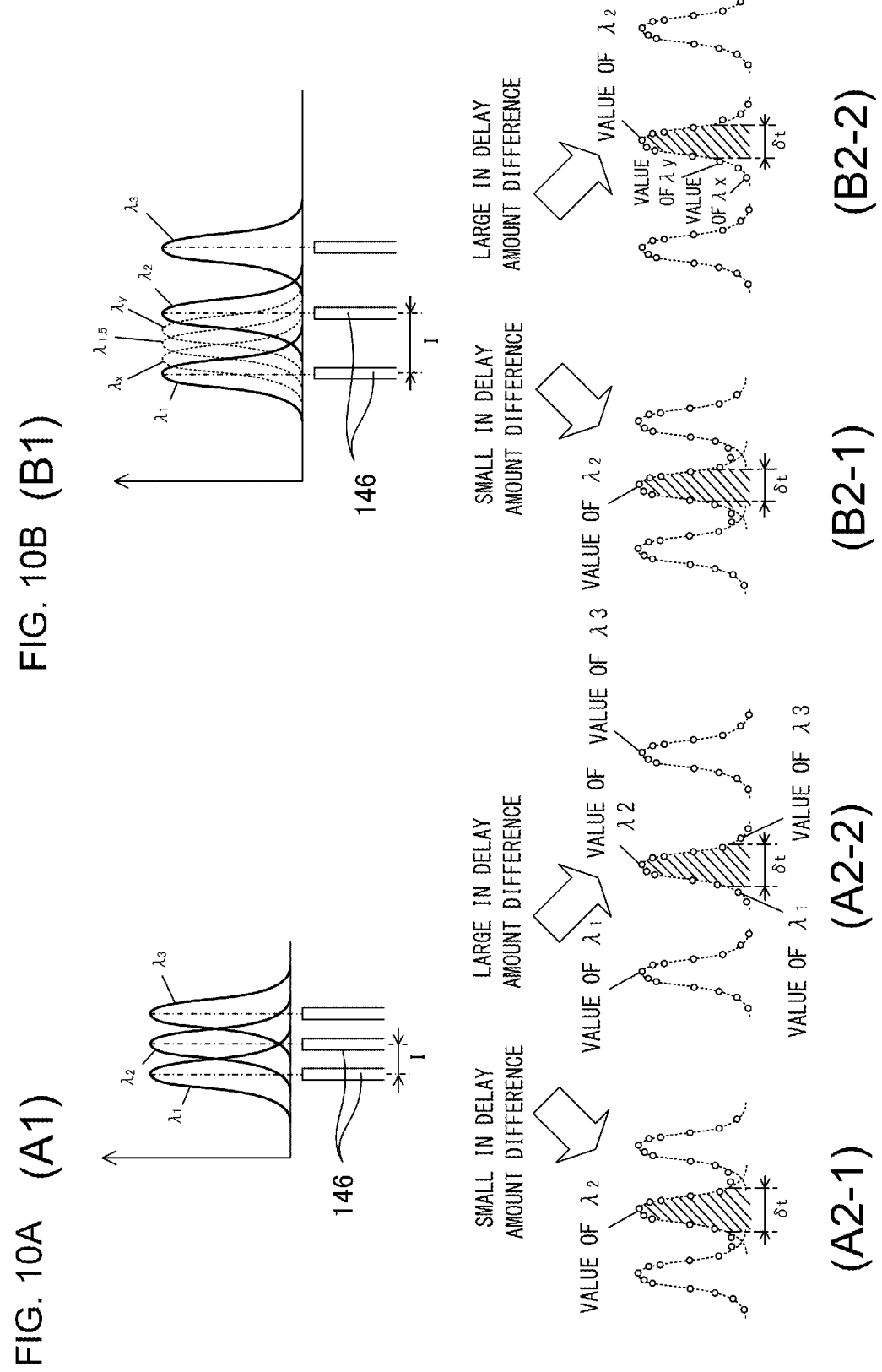

SPECTROSCOPIC MEASUREMENT METHOD

BACKGROUND

1. Technical Field

The invention of this application relates to a spectroscopic measurement technique.

2. Description of the Related Art

A technique for irradiating an object with light and measuring a spectrum of light (transmitted light, reflected light, scattered light, or the like) from the object is a typical technique for analyzing the composition and properties of the object. A typical spectroscopic measurement method is a method using a diffraction grating. Light to be measured incident from an incident slit is collimated by a concave mirror and radiated to the diffraction grating, and the dispersed light from the diffraction grating is similarly condensed by a concave mirror. A light receiver is disposed at the condensed position and the light is detected. By changing (scanning) the posture of the diffraction grating, light beams having different wavelengths are sequentially incident on the light receiver, and the output of the light receiver becomes a spectrum.

In addition, so-called Fourier transform spectroscopy is known as a method other than the method using the diffraction grating. This method is a method of changing an optical path length by scanning of a movable mirror when light is interfered by an interference optical system such as a Michelson interferometer and the interference light is made incident on a light receiver. The output of the light receiver is an interferogram, and a spectrum is obtained by Fourier transforming the interferogram.

CITATION LIST

Patent Literature

Patent Literature 1 JP 2013-205390 A

Non-Patent Literature

Non-Patent Literature 1 "Near-Infrared Spectroscopy", written and edited by Yukihiro Ozaki, published by Kodansha Ltd., pages 59 to 75

Among the conventional spectroscopic measurement techniques as described above, spectroscopic measurement using a diffraction grating requires scanning of the diffraction grating, and thus measurement at high speed cannot be performed. Fourier transform spectroscopy also requires scanning of a movable mirror, and thus there is a limit to measurement at high speed.

The demand for the high speed of the spectroscopic measurement is particularly remarkable when the spectroscopic measurement is performed for the purpose of product inspection. When the product is a certain kind of material (for example, a pharmaceutical product), the material is dissolved into a liquid phase, and spectroscopic measurement is performed by chromatography such as HPLC to quantify characteristic components. With this, the quality of the product can be determined. However, such a method is very time consuming and it is not possible to perform the manufactured product in real time on the spot. From the viewpoint of quality control, it is desirable to inspect all the products, which is not possible at all in this method. Assuming that a product is analyzed in real time at a manufacturing site, a high-speed spectroscopic measurement technique is inevitably required.

Meanwhile, a high SN ratio is also an important factor as well as high speed. Even if the spectroscopic measurement can be performed at high speed, if the SN ratio of the measurement result is low, the reliability of the measurement result is also low. Therefore, it is also difficult to apply such a method to product inspection.

SUMMARY

The invention of the present application has been made in view of such problems, and an object of the invention is to provide a spectroscopic measurement technique that achieves both high speed and a high SN ratio that can be suitably applied to product inspection.

In order to solve the above problems, the present specification first discloses an invention of a spectroscopic measurement method and an invention of a spectroscopic measurement apparatus.

A spectroscopic measurement method according to the disclosed invention includes: an irradiation step of irradiating an object with pulsed light in which an elapsed time in the pulsed light and a wavelength of light correspond to each other on a one-to-one basis multiple times; a light receiving step of receiving, by a light receiver, light pulses from the object irradiated with the pulsed light multiple times in the irradiation step; and a calculation processing step of converting an output from the light receiver that has received the light pulses in the light receiving step into a spectrum.

This spectroscopic measurement method includes an integration step of integrating, for respective wavelengths, values of the output of the light receiver at times at which it is regarded that the light receiver receives light having the same wavelength, and in the calculation processing step, respective integrated values for respective wavelengths after the integration in the integration step are used as intensities of light of respective wavelengths.

In addition, this spectroscopic measurement method may include a reference time applying step of applying a reference time to the integration in the integration step, wherein the reference time is used to identify the times at which it is regarded that the light receives light having the same wavelength.

In addition, the spectroscopic measurement method may have a configuration in which the reference time applying step includes a step of generating a trigger signal in accordance with emission of each of beams of the pulsed light, and in which the integration step includes a step of integrating values of the output of the light receiver at times at which elapsed times from the trigger signal are the same for outputs from the light receiver that has received beams of the pulsed light.

In addition, this spectroscopic measurement method may have a configuration in which the irradiation step includes steps of, causing ultrashort pulsed laser light from an ultrashort pulsed laser source to be incident on a nonlinear element to generate a nonlinear effect, so that the ultrashort pulsed laser light is broadened, causing the broadband pulsed light emitted from the nonlinear element to be incident on an extension element to extend a pulse width, and then irradiating the object multiple times. The reference time applying step includes a step of detecting the ultrashort pulsed laser light before being incident on the nonlinear element and generating the trigger signal.

In addition, this spectroscopic measurement method may have a configuration in which, in the irradiating step, ultrashort pulsed laser light from an ultrashort pulsed laser source is made incident on a nonlinear element to generate a nonlinear effect, so that the ultrashort pulsed laser light is broadened, the broadband pulsed light emitted from the nonlinear element is wavelength-divided by an arrayed waveguide diffraction grating, and then divided pulsed light that is the broadband pulsed light having been wavelength-divided is transmitted through delay fibers to be delayed, and beams of the divided pulsed light emitted from the delay fibers are collected and radiated to an object as combined pulsed light, and a material and a length of each of the delay fibers are selected such that an elapsed time in the combined pulsed light and a wavelength of light correspond to each other on a one-to-one basis, and in which the integration step includes a step of integrating each of values corresponding to each channel in the arrayed waveguide diffraction grating for outputs from the light receiver that has received light from the object irradiated with the combined pulsed light.

In addition, this spectroscopic measurement method may have a configuration in which each of the delay fibers has a normal dispersion characteristic or an abnormal dispersion characteristic in a wavelength range of each of beams of the incident divided pulsed light, and in which the integration step includes a step of integrating a pulse output from the light receiver corresponding to each of beams of the divided pulsed light in a narrow width excluding skirt portions on both sides of the pulse.

In addition, a spectroscopic measurement apparatus according to the disclosed invention includes: a pulsed light source structured to emit pulsed light in which an elapsed time in a pulse and a wavelength of light correspond to each other on a one-to-one basis; a light receiver disposed at a position to receive light from an object irradiated with the pulsed light from the pulsed light source; and a calculator structured to perform calculation processing of converting an output from the light receiver into a spectrum.

Then, the spectroscopic measurement apparatus further includes an integration unit structured to integrate values of the output of the light receiver at times at which it is regarded that the light receiver receives light having the same wavelength while the object is irradiated with the pulsed light multiple times by the pulsed light source, and in which the calculator is structured to use integrated values for respective wavelengths integrated by the integration unit as intensities of light of respective wavelengths.

In addition, in this spectroscopic measurement apparatus, the integration unit may be provided with a reference time applying unit structured to apply a reference time which is used to specify the times at which it is regarded that the light receiver receives light having the same wavelength.

In addition, the spectroscopic measurement apparatus may have a configuration in which the reference time applying unit is a trigger signal generator structured to generate a trigger signal in accordance with emission of each of beams of the pulsed light in the pulsed light source, in which the trigger signal generator is connected to the integration unit such that the trigger signal is input to the integration unit, and in which the integration unit is structured to integrate values at times at which elapsed times from the trigger signal are the same for outputs from the light receiver that has received beams of the pulsed light.

In addition, the spectroscopic measurement apparatus may have a configuration in which the pulsed light source includes an ultrashort pulsed laser source, a nonlinear element structured to generate a nonlinear effect in ultrashort pulsed laser light from the ultrashort pulsed laser source to broaden the ultrashort pulsed laser light, and an extension element structured to extend a pulse width of the broadband pulsed light emitted from the nonlinear element, and in which the trigger signal generator includes a detector structured to detect the ultrashort pulsed laser light before being incident on the nonlinear element to generate the trigger signal.

In addition, the spectroscopic measurement apparatus may have a configuration in which the pulsed light source includes an ultrashort pulsed laser source, a nonlinear element that generates a nonlinear effect in ultrashort pulsed laser light from the ultrashort pulsed laser source to broaden the ultrashort pulsed laser light, an arrayed waveguide diffraction grating that wavelength-divides the broadband pulsed light emitted from the nonlinear element, and delay fibers structured to transmit and delay the divided pulsed light that is the pulsed light having been wavelength-divided by the arrayed waveguide diffraction grating, and a material and a length of each of the delay fibers are selected such that an elapsed time in the combined pulsed light and a wavelength of light correspond to each other on a one-to-one basis when beams of the divided pulsed light emitted from the delay fibers are collected and radiated to an object as the combined pulsed light, and in which the integration unit is structured to integrate an output from the light receiver that has received light from the object irradiated with the combined pulsed light for each value corresponding to each channel in the arrayed waveguide diffraction grating.

In addition, the spectroscopic measurement apparatus may have a configuration in which each of the delay fibers has a normal dispersion characteristic or an abnormal dispersion characteristic in a wavelength range of each of beams of the incident divided pulsed light, and in which the integration unit is structured to integrate a pulse output from the light receiver corresponding to each of beams of the divided pulsed light in a narrow width excluding skirt portions on both sides of the pulse.

Furthermore, in order to solve the above problems, the present specification discloses each invention of a product inspection method, a product inspection device, and a product sorting device.

A product inspection method according to the disclosed invention includes: in the spectroscopic measurement method according to the disclosed invention, a spectroscopic measurement step of performing execution using a manufactured product as the object; and a quality determination step of determining quality of the product according to a result of the spectroscopic measurement in the spectroscopic measurement step.

In addition, this product inspection method may have a configuration in which the spectroscopic measurement step includes a step of measuring an absorption spectrum of a product as the object, in which the product inspection method includes a quantification step of quantifying a specific component of the product from the measured absorption spectrum, and in which the quality determination step includes a step of determining quality of the product from an amount of the specific component obtained in the quantification step.

In addition, this product inspection method may have a configuration in which the spectroscopic measurement step includes a step of measuring an absorption spectrum of a product, in which the product has a transmittance of the pulsed light at a wavelength average of less than 10%, in which the irradiation step includes a step of irradiating the same product as the object with the pulsed light 100 times or more, and in which the integration step includes a step of integrating values at times at which light having the same wavelength is regarded as being received for the pulsed light emitted 100 times or more.

In addition, in this product inspection method, the irradiation step may include a step of irradiating the moving same product with the pulsed light multiple times.

A product inspection device according to the disclosed invention includes the spectroscopic measurement apparatus according to the disclosed invention that spectrally measures a manufactured product as an object. Then, the product inspection device includes a quality determiner structured to determine quality of the product according to a result of the spectroscopic measurement obtained by a calculator.

In addition, the product inspection device may have a configuration in which the light receiver is provided at a position to receive light transmitted through the product, and the calculator is structured to obtain an absorption spectrum of the product as a measurement result, in which the product inspection device includes a quantification unit structured to quantify a specific component of the product from the measured absorption spectrum, and in which the quality determiner is structured to determine the quality of the product from an amount of the specific component obtained by the quantitative unit.

In addition, the product inspection device may have a configuration in which the pulsed light source is a light source that irradiates the same product with the pulsed light 100 times or more, and in which the integration unit is structured to integrate respective values at respective times at which light having the same wavelength is regarded as being received for the pulsed light radiated 100 times or more.

In addition, the product sorting device according to the disclosed invention includes the product inspection device according to the disclosed invention, and further includes an exclusion mechanism structured to exclude a product determined to be a defective product by the quality determiner from a manufacturing line.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 3 is a diagram schematically showing a main part of an example of a measurement program included in the spectroscopic measurement apparatus;

FIGS. 10A and 10B are schematic diagrams showing crosstalk reduction by selecting an integration range;

DESCRIPTION OF EMBODIMENTS

Hereinafter, modes (embodiments) for carrying out the invention of this application will be described.

Figure 1:
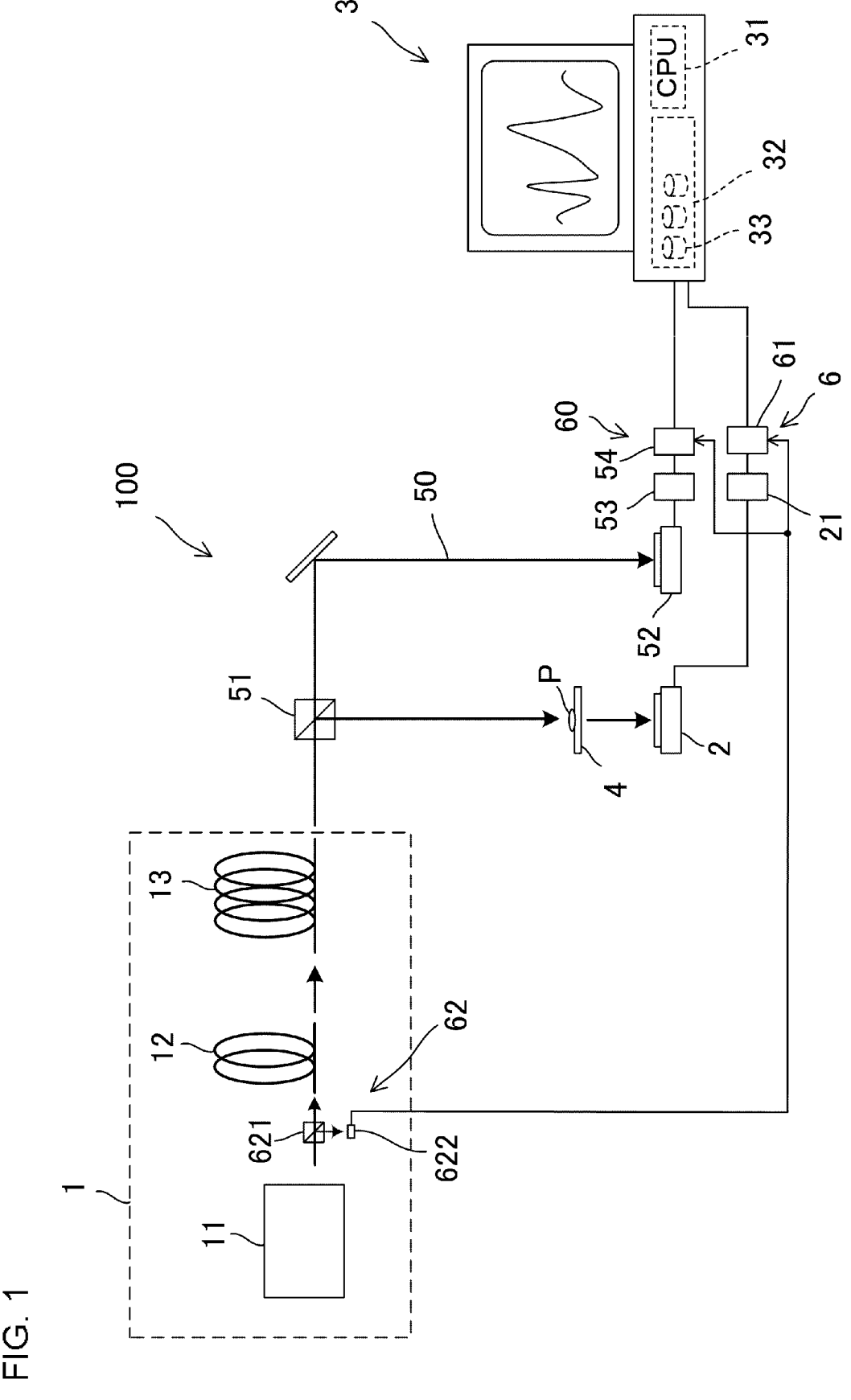
FIG. 1 is a schematic diagram of a spectroscopic measurement apparatus according to a first embodiment.

First, embodiments of the invention of a spectroscopic measurement apparatus will be described. FIG. 1 is a schematic diagram of a spectroscopic measurement apparatus according to a first embodiment.

The spectroscopic measurement apparatus of the embodiment is a device that irradiates an object P with pulsed light and spectrally measures light (for example, transmitted light) from the object P in order to realize high-speed measurement. More specifically, one of the feature points of the spectroscopic measurement apparatus of the embodiment is that the device irradiates the object P with the pulsed light in which the elapsed time in the pulse and the wavelength of the light correspond to each other on a one-to-one basis.

In recent years, research to broaden the wavelength of a pulsed laser has been actively conducted, and a typical example thereof is generation of super continuum light (hereinafter, referred to as SC light) using a nonlinear optical effect. The SC light is light obtained by passing light from the pulsed laser through a nonlinear element such as a fiber and broadening the wavelength by a nonlinear optical effect such as self-phase modulation or stimulated Raman scattering.

The broadband pulsed light is greatly extended as a wavelength region, but the pulse width (time width) remains close to the pulse width of the input pulse used to generate the SC light. However, when a group delay in a transmission element such as a fiber is used, the pulse width can also be extended. At this time, when an element having an appropriate wavelength dispersion characteristic is selected, pulse extension can be performed in a state where the time (elapsed time) and the wavelength in the pulse correspond to each other on a one-to-one basis.

The spectroscopic measurement apparatus of the embodiment is a device that irradiates the object P with the broadband pulsed light (broadband extended pulsed light) extended as described above. More specifically, the spectroscopic measurement apparatus of the embodiment includes a pulsed light source 1 that emits the broadband extended pulsed light, a light receiver 2 disposed at a position to receive the light from the object P irradiated with the broadband extended pulsed light from the pulsed light source 1, and a calculator 3 that performs processing of converting the output from the light receiver 2 into a spectrum.

The pulsed light source 1 includes an ultrashort pulsed laser source 11, a nonlinear element 12, and an extension element 13. As the ultrashort pulsed laser 11, a fiber laser is used in this embodiment. As the ultrashort pulsed laser 11, in addition to this, a gain-switched laser, a microchip laser, or the like can be used.

As the nonlinear element 12, a fiber is often used. For example, a photonic crystal fiber or other nonlinear fibers can be used as the nonlinear element 12. The mode of the fiber is often a single mode, but even a multimode can be used as the nonlinear element 12 as long as it exhibits sufficient nonlinearity.

Such a pulsed light source 1 desirably emits pulsed light having a continuous spectrum over a wide wavelength range including a measurement wavelength range. For example, the pulsed light source 1 is desirably a light source that emits light having a continuous spectrum over a wavelength width of at least 10 nm in a range of 900 nm to 1300 nm. The "continuous spectrum over a wavelength width of at least 10 nm in a range of 900 nm to 1300 nm" means any continuous wavelength width of 10 nm or more in the range of 900 to 1300 nm. For example, the spectrum may be continuous from 900 to 910 nm or may be continuous from 990 to 1000 nm. In addition, it is more preferable that the spectrum is continuous over a wavelength width of 50 nm or more, and it is still more preferable that the spectrum is continuous over a wavelength width of 100 nm or more. In addition, "the spectrum is continuous" means to include the spectrum continuous at a certain wavelength width. This is not limited to the case of being continuous in the entire spectrum of the pulsed light, and may be partially continuous.

Figures 2A, 2B:
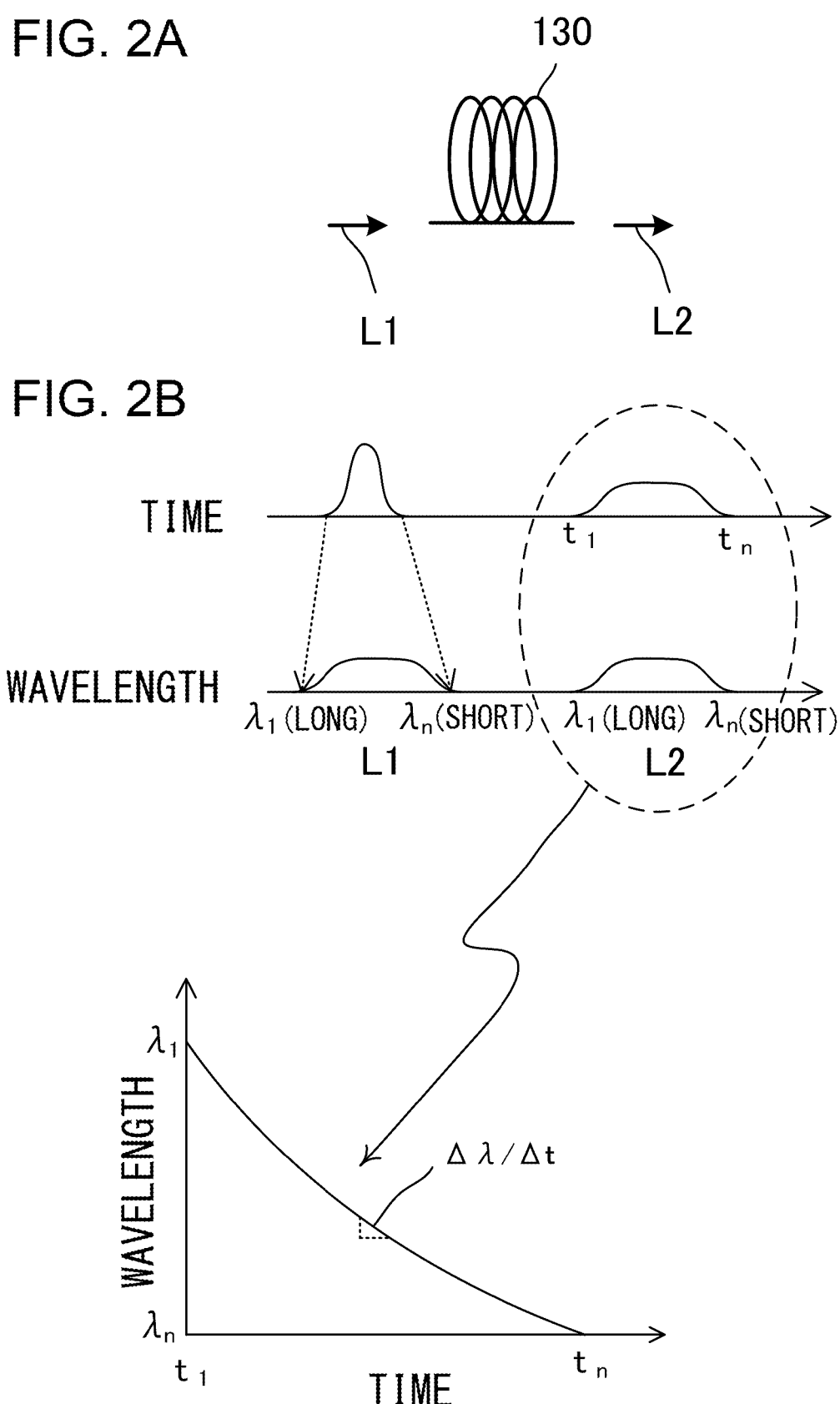
FIG. 2A is a schematic diagram showing a pulse extension by an extension element and FIG. 2B is a diagram showing one-to-one relation between time and wavelength in a light pulse.

As described above, the extension element 13 is an element that extends so that the relationship between the time and the wavelength of light in the extended pulse is one-to-one. This point will be described with reference to FIGS. 2A-2C. FIG. 2A is a schematic diagram showing a pulse extension by the extension element.

When SC light L1 having a continuous spectrum in a certain wavelength range is passed through a delay fiber (group delay fiber) 130 having a positive dispersion characteristic in the wavelength range, the pulse width is effectively extended. As shown in row (2) of FIG. 2B, in the SC light L1, light having a longest wavelength $\lambda_1$ exists at the beginning of one pulse though it is an ultrashort pulse, light having a shorter wavelength gradually exists as time elapses, and light having a shortest wavelength $\lambda_n$ exists at the end of the pulse. When this light is passed through the normally dispersed delay fiber 130, in the normally dispersed delay fiber 130, light having a shorter wavelength propagates with a delay, so that the time difference in one pulse is increased, and when the light is emitted from the delay fiber 130, the light having a shorter wavelength is further delayed as compared with light having a longer wavelength. As a result, SC light L2 to be emitted is light having the extended pulse width in a state where uniqueness of time to wavelength is secured. That is, as shown on the row (3) of FIG. 2B, in times $t_1$ to $t_n$, pulse extension is performed in a one-to-one correspondence with the wavelengths $\lambda_1$ to $\lambda_n$. The pulsed light in which the wavelength continuously changes with the lapse of time as described above may be referred to as chirped pulsed light.

As the extension element 13, an anomalous dispersion fiber can also be used. In this case, in the SC light, the light on the long wavelength side existing at the beginning of the pulse is delayed, and the light on the short wavelength side existing at the later time is dispersed in the traveling state. Therefore, the temporal relationship in one pulse is reversed, and pulse extension is performed in the state where the light on the short wavelength side exists at the beginning of one pulse and the light on the longer wavelength side exists with the lapse of time. However, as compared with the case of normal dispersion, it is often necessary to further increase the propagation distance for pulse extension, and the loss tends to be large. Therefore, normal dispersion is preferable in this respect.

On the other hand, as shown in FIG. 1, the object P is irradiated with the pulsed light extended by the extension element 13 by an irradiation optical system. A holding member that holds the object P is provided at the irradiation position. In this embodiment, since the holding member is configured to radiate pulsed light from the upper side, the holding member is a receiving jig 4. In addition, since the device of this embodiment is a device that measures the spectral transmission characteristic of the object P, the receiving jig 4 is translucent, and the light receiver 2 is provided at a position to receive the transmitted light. In addition, a configuration in which a slit narrower than the width of the object P is provided in the receiving jig 4, and the light receiver 2 receives the transmitted light through the slit may be adopted.

In addition, in this embodiment, a configuration for acquiring a measurement value for reference in real time is adopted. That is, as shown in FIG. 1, a beam splitter 51 that splits an optical path extending from the extension element 13 is provided. One of the split optical paths is for measurement and reaches the light receiver 2 via the object P. The other optical path 50 is a reference optical path, and a reference light receiver 52 is disposed on this optical path. The light (reference light) traveling through the reference optical path 50 reaches the reference light receiver 52 without passing through the object P.

As the calculator 3, a general-purpose PC is used in this embodiment. Furthermore, an AD converter 21 is provided between the light receiver 2 and the calculator 3, and the output of the light receiver 2 is input to the calculator 3 via the AD converter 21. An AD converter 53 is also provided between the reference light receiver 52 and the calculator 3, and the output of the reference light receiver 52 is also digitized and input to the calculator 3.

The calculator 3 includes a processor 31 and a storage (hard disk, memory, etc.) 32. In the storage 32, a measurement program 33 for processing output data from the light receiver 2 and calculating a spectrum and other necessary programs are installed. FIG. 3 is a diagram schematically showing a main part of an example of a measurement program included in the spectroscopic measurement apparatus.

The example of FIG. 3 is an example of a program in which the measurement program 33 measures an absorption spectrum (spectral absorption rate). In the calculation of the absorption spectrum, the reference spectrum intensity is used. The reference spectrum intensity is a value for each wavelength serving as a reference for calculating the absorption spectrum. In this embodiment, the reference spectral intensity is the output from the reference light receiver 52 input via the AD converter 53 (real-time reference spectral intensity). The reference spectral intensity is a value for each time resolution $\Delta t$, and is stored as a reference intensity at each time ($t_1$, $t_2$, $t_3$, . . . ) for each $\Delta t$ ($v_1$, $v_2$, $v_3$, . . . ).

The reference intensities $V_1$, $V_2$, $V_3$, . . . at the times $t_1$, $t_2$, $t_3$, . . . are intensities (spectra) of the corresponding wavelengths $\lambda_1$, $\lambda_2$, $\lambda_3$, . . . . The relationships between the times $t_1$, $t_2$, $t_3$, . . . and the wavelengths in one pulse are examined in advance, and it is handled that the values $V_1$, $V_2$, $V_3$, . . . at the times are values of $\lambda_1$, $\lambda_2$, $\lambda_3$, . . . .

Then, the output from the light receiver 2 that has received the light passing through the object P passes through the AD converter 21 and is similarly stored in the memory as the value (measurement value) of each of the times $t_1, t_2, t_3, \ldots (v_1, v_2, v_3, \ldots)$. Each measurement value is compared with the reference spectrum intensity ($v_1/V_1$, $v_2/V_2$, $v_3/V_3, \ldots$) and the result is the absorption spectrum (taking the logarithm of the inverse as appropriate). The measurement program 33 is programmed so as to perform the calculation processing as described above.

Note that, although not shown, since the AD converter 21 for measurement and the AD converter 53 for reference need to perform sampling in synchronization, a synchronization circuit for sharing a clock signal is provided.

The spectroscopic measurement apparatus of such an embodiment includes an integration unit 6 in order to realize measurement of a high SN ratio. The integration unit 6 is structured to integrate values at times regarded as having the same wavelength for the outputs from the light receiver 2 by beams of the pulsed light. In this embodiment, the integration unit 6 is structured to perform integration by hardware, and a field programmable gate array (FPGA) 61 is used as the integration unit 6.

In addition, in order to optimize the integration in the integration unit 6, the spectroscopic measurement apparatus according to the embodiment includes a reference time applying unit. The reference time applying unit is an element that applies, to the integration unit 6, a reference time for specifying each time regarded as having the same wavelength for the outputs from the light receiver 2 by beams of the pulsed light. In this embodiment, a trigger signal generator 62 that generates a trigger signal having a certain temporal relationship with respect to each pulsed light reaching the light receiver 2 is adopted as the reference time applying unit. More specifically, the trigger signal generator 62 that generates a trigger signal as the pulsed light source 1 emits each pulsed light is adopted.

As shown in FIG. 1, the trigger signal generator 62 generates a trigger signal by extracting and detecting a part of the output of the ultrashort pulsed laser source 11. That is, the trigger signal generator 62 includes a beam splitter 621 that extracts a part of the output from the ultrashort pulsed laser 11 and a detector 622 that detects the extracted light. In addition, a part of the output from the nonlinear element 12 may be extracted by the beam splitter 621 and used as a trigger signal.

Figure 4:
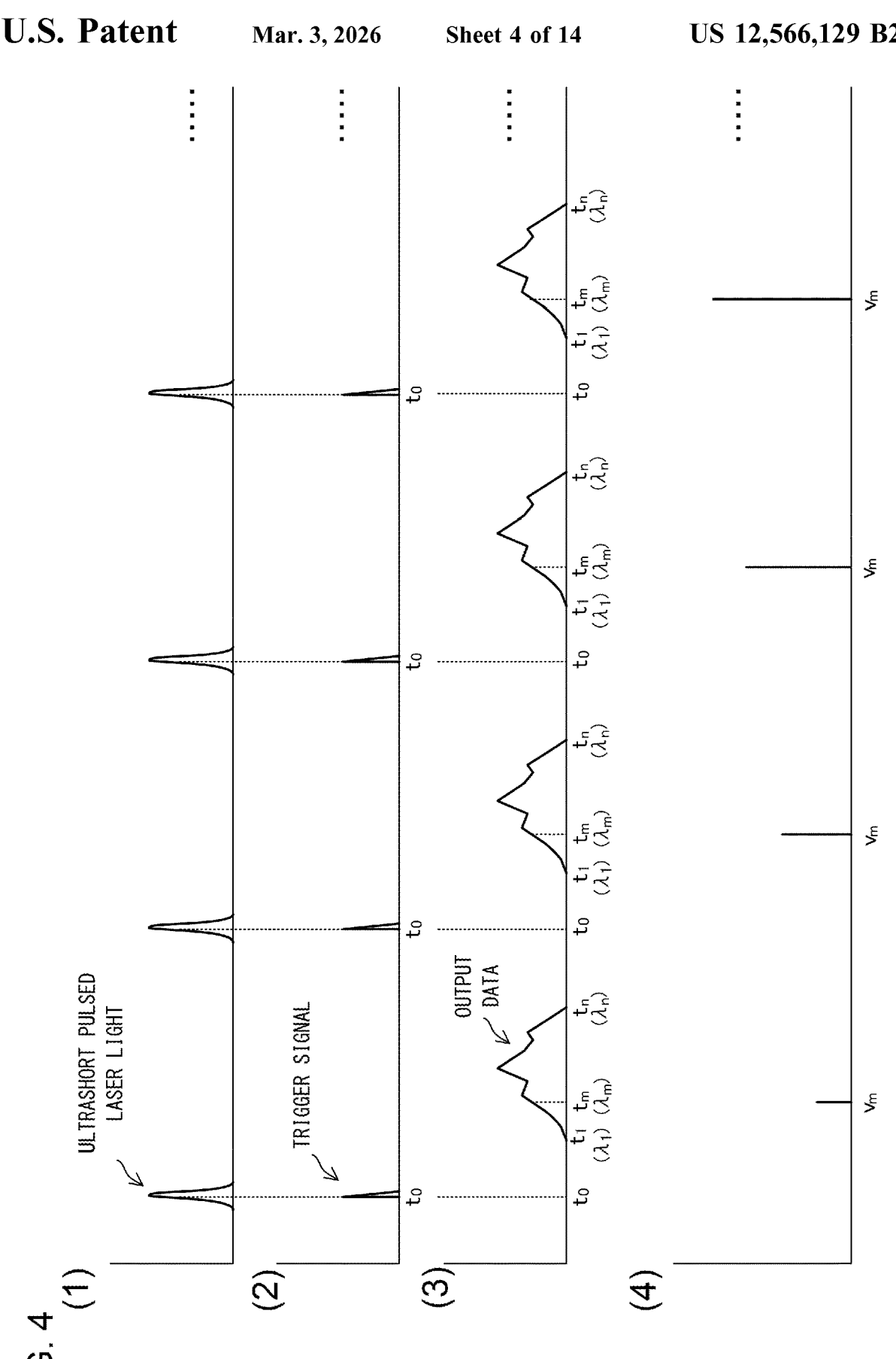
FIG. 4 is a schematic diagram showing integration by an integration unit.

FIG. 4 is a schematic diagram showing integration by the integration unit 6. Row (1) of FIG. 4 shows ultrashort pulsed laser light emitted from the ultrashort pulsed laser source 11, and row (2) of FIG. 4 shows a trigger signal generated by the trigger signal generator 62. In addition, row (3) of FIG. 4 shows pulsed light (broadband extended pulsed light) that has been broadened by the nonlinear element 12 and further extended by the extension element 13. Row (4) of FIG. 4 shows integration for a certain channel, and shows a state in which a value increases with the integration. Note that each horizontal axis in FIG. 4 is time, but the elapsed time (each time) corresponds to the wavelength as described above.

As shown in row (2) of FIG. 4, the trigger signal generator 62 generates a trigger signal with the emission of the ultrashort pulsed laser light. The trigger signal is generated at a timing when the light intensity signal detected by the detector 622 exceeds a certain threshold, and the timing is stable. In addition, as a simpler configuration, the light intensity signal detected by the detector 622 can be used as a trigger signal by voltage adjustment.

In row (4) of FIG. 4, v m is a value in a certain channel $C_n$. The "channel" is a term for convenience of description, and means a time at which the elapsed time from the reference time can be regarded as the same. Row (4) of FIG. 4 shows a state in which only one channel $C_n$ is extracted and integrated for understanding, but actually, there is a channel for each sampling period in the AD converter 21, and integration is performed in each channel.

Figure 5A:
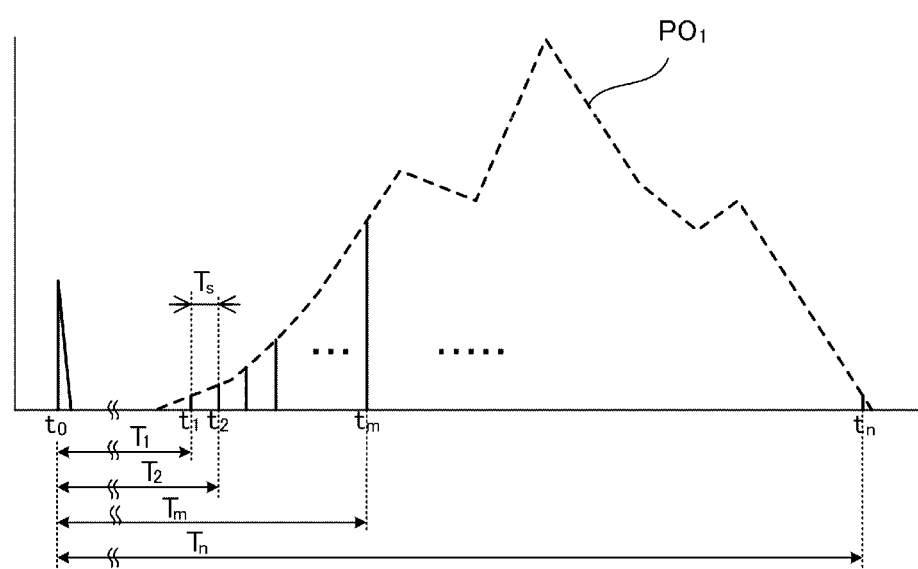
FIGS. 5A-5C are schematic diagrams showing sampling periods and channels in an AD converter.
Figure 5B:
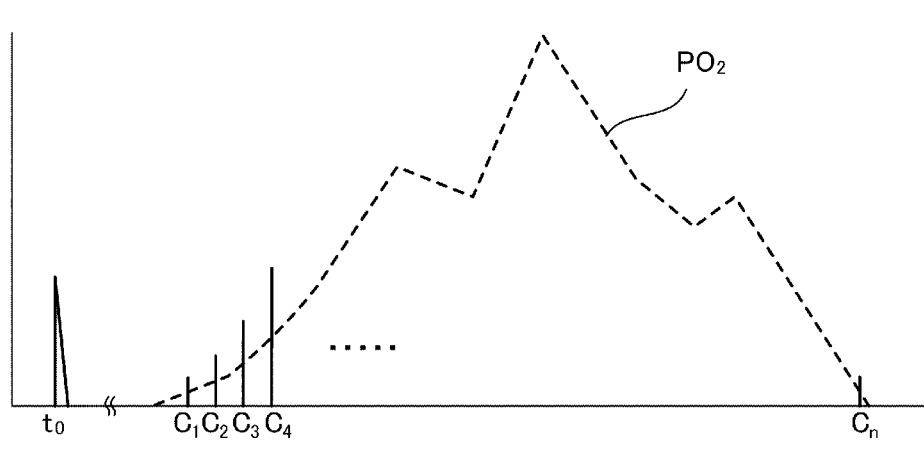
Figure 5C:
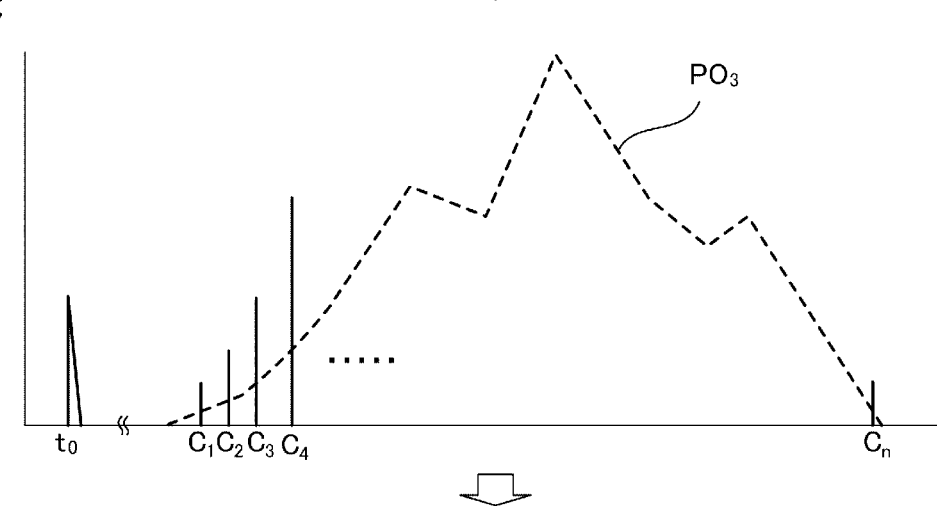

FIGS. 5A-5C are schematic diagrams showing sampling periods and channels in the AD converter 21.

In FIG. 5A, an example of a waveform of one pulse output $PO_1$ output from the light receiver 2 is indicated by a broken line. This output is analog and is digitized by the AD converter 21. Digitization is processing of extracting the value of the analog output in a sampling period $T_s$ and converting the value into a digital value. For convenience of illustration, the sampling period $T_s$ is drawn wider than actual.

In the analog pulse output $PO_1$, $t_1$ is the first channel ($C_1$) when $t_1$ is the time at which the rise of the pulse, that is, the value that can be regarded as effectively exceeding 0 first is sampled. Time $t_2$ of the next sampling is the next channel $C_2$. That is, the time for each sampling period $T_s$ with $t_1$ as a base point is the channels $C_1$ to $C_n$. Row (4) of FIG. 4 shows integration in a certain channel $C_m$ (integration of the value v m at the time $t_m$).

As described above, each trigger signal is input to the FPGA 61 used as the integration unit 6. When the output of the first pulsed light from the light receiver 2 is digitized and transmitted by the AD converter 21, the FPGA 61 stores elapsed times $T_1$ to $T_n$ from time $t_1$ to time $t_n$ with reference to time $t_0$ of the trigger signal. That is, time $T_1$ from $t_0$ to $t_1$, time $T_2$ from $t_0$ to $t_2, \ldots$ time $T_n$ from $t_0$ to $t_n$ are stored.

Then, as shown in FIGS. 5B and 5C, the FPGA 61 adds and integrates values (values sampled by the AD converter 21) corresponding to the stored elapsed times for pulse outputs $PO_2$, $PO_3, \ldots$ from the light receiver 2 by the next and subsequent pulsed light. That is, the value of the channel $C_1$ (value of the same elapsed time $T_1$) of the next pulsed light is added to the value of the channel $C_1$ of the first pulsed light, the value of the channel $C_2$ of the next pulsed light (value of the same elapsed time $t_2$) is added to the value of the channel $C_2$ of the first pulsed light, and the value of the channel $C_n$ (value of the same elapsed time $T_n$) of the next pulsed light is added to the value of the channel $C_n$ of the first pulsed light.

The FPGA 61 sequentially performs adding for the pulse outputs $PO_1$, $PO_2$, $PO_3$, in the channels $C_1$ to $C_n$, and integrates the values in the channels $C_1$ to $C_n$. The FPGA 61 is programmed in advance to perform such processing.

Note that, as understood from the above description, each of the channels $C_1$ to $C_n$ corresponds to "order" of a value when the AD converter 21 digitizes the output from the light receiver 2 by each pulsed light. Therefore, the FPGA 61 may be programmed to simply add values in the same order (same order). That is, the channels $C_1$ to $C_n$ are times separated from the time to of the trigger signal by a predetermined number of sampling points, and integration processing is performed between pulses on the digital values in the channels $C_1$ to $C_n$.

As can be seen from the above description, in this embodiment, it is based on the premise that values that are the same elapsed time from the time of the trigger signal may be regarded as values of the same wavelength (light intensity). In this case, if the extension state differs among beams of the pulsed light due to the extension element 13, the timing of reaching the light receiver 2 differs even with the same wavelength, and thus this premise collapses. However, the repetition frequency of the pulsed light is on the order of kHz at the lowest, and is, for example, 0.1 seconds or less even when the pulsed light is repeated 100 times. It is not considered that a change that causes a problem in the extension characteristics of the extension element 13 occurs in such a very short time, and it is not practical that the above premise collapses.

Note that it is assumed that a change occurs in the extension characteristic of the extension element 13 when considered in a longer span, and the main factor is temperature. Therefore, the extension element 13 may be accommodated in a thermostatic bath or the like and the temperature may be maintained constant.

Figure 6:
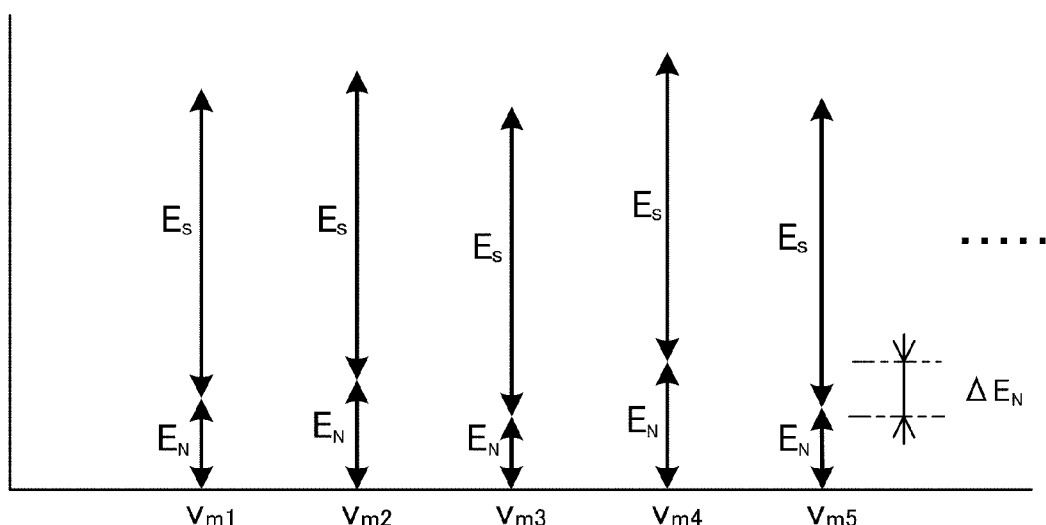
FIG. 6 is a schematic diagram showing SN ratio improvement by an integration unit.

In any case, the SN ratio of the spectroscopic measurement is greatly improved by such integration processing. Hereinafter, this point will be described with reference to FIG. 6. FIG. 6 is a schematic diagram showing the SN ratio improvement by the integration unit 6.

In FIG. 6, values $v_{m1}$ to $v_{m5}$ . . . of a certain channel $C_n$ at the output of the light receiver 2 by each pulsed light are shown. Each value is a value in the first pulsed light, a value in the second pulsed light, . . . . As described above, the output from the light receiver 2 also includes the noise component, and the value of the channel $C_m$ includes a noise component $E_N$ in addition to a signal $E_S$ of the original light intensity.

If the magnitude of the noise component $E_N$ in the channel $C_n$ is completely the same in each pulse, there is no influence of the noise component $E_N$. However, the incident state of stray light or background light and the magnitude of electrical noise are not exactly the same in each pulse, and in general, the magnitude of the noise component $E_N$ is different in each pulse.

If there is such a variation in the noise component between the pulses, the calculation result of the absorption rate is different even after division by the reference spectral intensity. That is, although the actual absorption rates are the same, it is calculated that the absorption rates are different from each other from the difference in the noise component.

On the other hand, when the integration is performed by the integration unit 6, the fluctuation range $\Delta E_N$ of the noise component $E_N$ can be suppressed to be small. That is, when the values are integrated in a certain channel $C_m$, the variation range $\Delta E_N$ of the included noise component $E_N$ decreases in inverse proportion to the ½ power of the number of integrations. Therefore, the amount of noise included in the final measurement result is reduced.

What is important in such integration processing is that the spectroscopic measurement apparatus of the embodiment assumes that the light transmittance of the object P is very low and the signal intensity is extremely low. The term "very low" assumes that the light transmittance is less than 10%, more specifically, 5% or less (1 to 5%, 0.5 to 5%, etc.) or 3% or less (for example, 0.5 to 3%, 0.1 to 3%, and the like). Therefore, the light to be measured (light transmitted through the object P) incident on the light receiver 2 is weak, and the amount of the noise component is relatively large. When the amount of the noise component is large, the variation also increases, and thus the SN ratio improvement by the integration is particularly effective. According to the study of the inventors, in the case of measuring the absorption spectrum of the object P having a low light transmittance as described above, it has been found that when integration is performed 100 times or more, the SN ratio is increased 10 times or more, which is particularly effective. Therefore, it is preferable to irradiate the object P with at least 100 beams of pulsed light, integrate the values in each channel, and then compare the integrated value with the reference spectral intensity. In the case of 1000 times or more, the SN ratio becomes 30 times or more, which is more preferable.

As shown in FIG. 1, an FPGA 54 as an integration unit 60 is also provided for the output from the reference light receiver 52, and the value digitized by the reference AD converter 53 is integrated in each channel. In one measurement, the number of beams of pulsed light (the number of pulses) incident on the reference light receiver 52 is the same as that of the measurement light receiver 2, and thus the number of times of integration in the integration unit 60 is also the same.

Each of the FPGAs 61 and 54 as the integration units 6 and 60 outputs data (each value of the channel $C_1$ to the channel $C_n$) integrated in each channel as a data set to the calculator 3. This data set corresponds to $v_1$ to $v_n$ and $V_1$ to $V_n$ described above.

A gate signal (not shown) is input to the FPGAs 61 and 54 in order to designate a time zone (gate) in which the integration processing between the pulses is performed in each of the channels $C_1$ to $C_n$. In this embodiment, the calculator 3 is configured to generate gate signals for the FPGAs 61 and 54.

Next, the operation of the spectroscopic measurement apparatus of such an embodiment will be described. The following description is also a description of the spectroscopic measurement method.

When spectroscopic measurement is performed using the spectroscopic measurement apparatus of the embodiment, the object P is placed on the receiving jig 4 and the pulsed light source 1 is operated. In the pulsed light source 1, the ultrashort pulsed light emitted from the ultrashort pulsed laser source 11 is broadened by the nonlinear element 12 and is pulse-extended by the extension element 13. The emitted pulsed light is divided by the beam splitter 51, one of which is radiated to the object P, and the pulsed light transmitted through the object P reaches the light receiver 2. The other divided pulsed light reaches the reference light receiver 52 as it is.

The irradiation of the pulsed light and the incidence of the pulsed light on each of the light receivers 2 and 52 are repeated multiple times, and an output by each pulsed light is generated from each of the light receivers 2 and 52. Each output is sampled and digitized by the AD converters 21 and 53, and is integrated by the FPGAs 61 and 54 as the integration units 6 and 60. Then, the data sets $v_1$ to $v_n$ of the measurement signals and the data sets $V_1$ to $V_n$ of the reference signals are input to the calculator 3. The calculator 3 divides each value included in the data sets $v_1$ to $v_n$ of the measurement signals by the reference intensity at the same time acquired from the data sets $V_1$ to $V_n$ of the reference signals to obtain a measurement result of the absorption spectrum.

According to the spectroscopic measurement apparatus or the spectroscopic measurement method of such an embodiment, the spectroscopic measurement is performed by irradiating the object P with the pulsed light in which the elapsed time and the wavelength of light correspond to each other on a one-to-one basis, and thus, it is possible to realize the spectroscopic measurement at a very high speed. In addition, since a measurement result is obtained by integrating values at times that can be regarded as having the same wavelength, a high SN ratio is also achieved at the same time. In order to increase the SN ratio, it is necessary to radiate pulsed light multiple times, but the repetition frequency of the pulsed light can be sufficiently high, and the influence on the high-speed measurement is substantially zero. For example, when an ultrashort pulsed laser source having a repetition frequency of 10 kHz is used, the time required for 100 times of irradiation with pulsed light is only 10 milliseconds.

Figure 7:
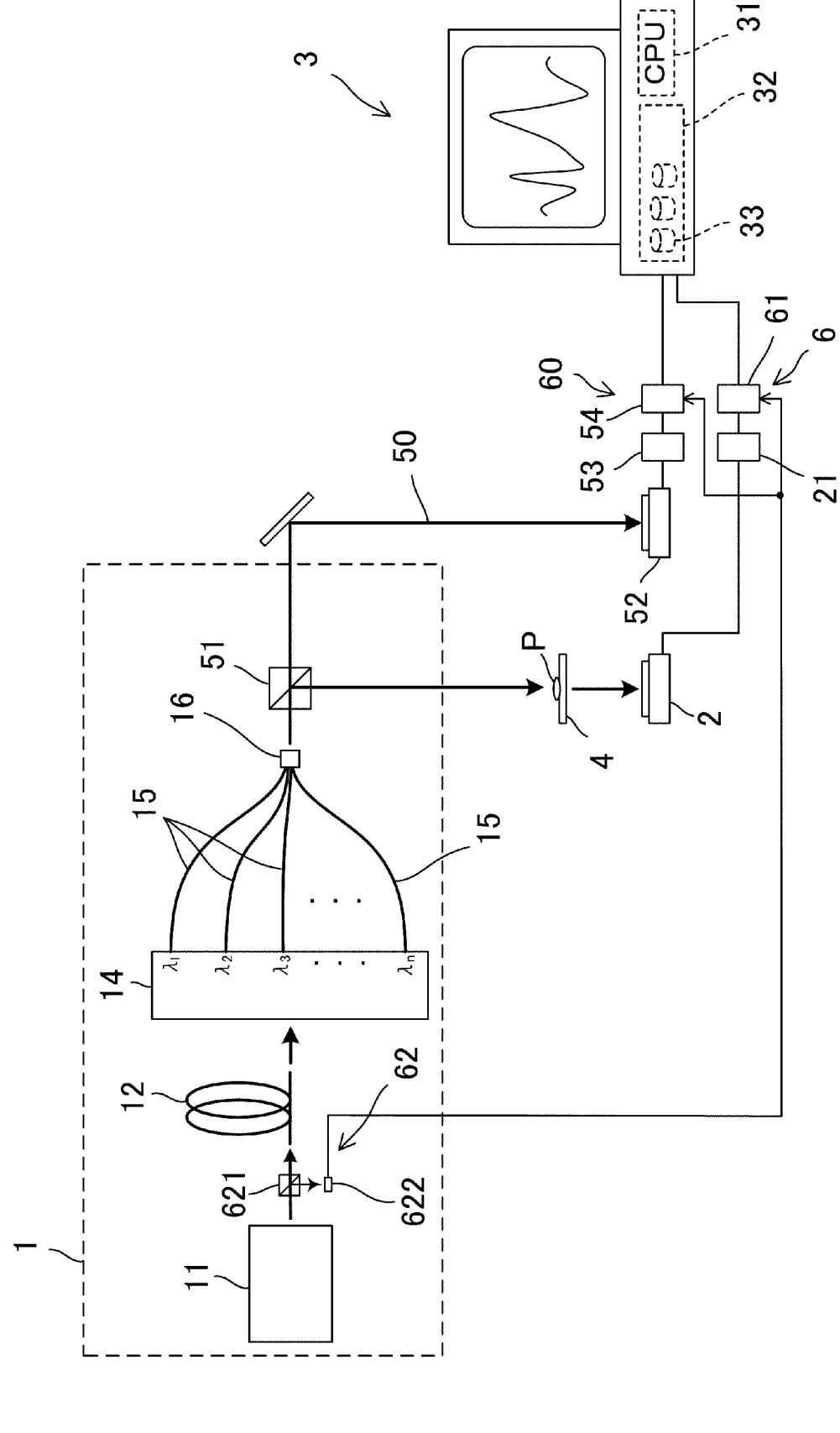
FIG. 7 is a schematic diagram of a spectroscopic measurement apparatus of a second embodiment.

Next, a spectroscopic measurement apparatus and a spectroscopic measurement method of a second embodiment will be described. FIG. 7 is a schematic diagram of the spectroscopic measurement apparatus of the second embodiment.

The second embodiment is different from the first embodiment in a configuration for realizing one-to-one correspondence between an elapsed time in a pulse and a wavelength of light. In the second embodiment, the pulsed light emitted from the nonlinear element 12 is divided into each wavelength by a dividing element, and an appropriate delay amount is secured at the time of transmission through the fiber for each wavelength, thereby realizing one-to-one correspondence.

Figure 8:
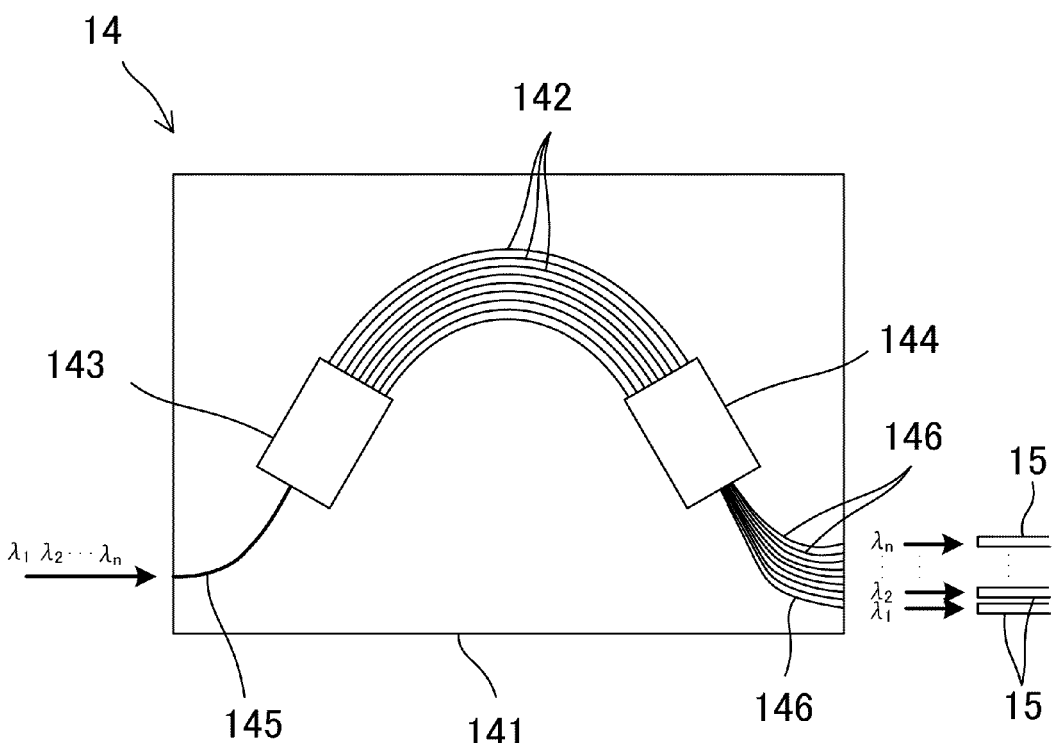
FIG. 8 is a schematic diagram of an arrayed waveguide diffraction grating adopted as a dividing element in the second embodiment.

In this embodiment, an arrayed waveguide diffraction grating (Array Waveguide Grating, AWG) 14 is adopted as the dividing element that divides the light into the respective wavelengths. FIG. 8 is a schematic diagram of the arrayed waveguide diffraction grating adopted as the dividing element in the second embodiment.

The arrayed waveguide diffraction grating is an element developed for optical communication, and is not generally used for spectroscopic measurement. As shown in FIG. 8, the arrayed waveguide diffraction grating 14 is configured by forming each of functional waveguides 142 to 146 on a substrate 141. The functional waveguides are a large number of grating waveguides 142 having slightly different optical path lengths, slab waveguides 143 and 144 connected to both ends (incident side and emission side) of the grating waveguides 142, an incident-side waveguide 145 that causes light to be incident on the incident-side slab waveguide 143, and emission-side waveguides 146 that extract light having each wavelength from the emission-side slab waveguide 144.

The slab waveguides 143 and 144 are free spaces, and light incident through the incident-side waveguide 145 spreads in the incident-side slab waveguide 143 and is incident on each grating waveguide 142. Since the lengths of the grating waveguides 142 are slightly different from each other, the phases of the light reaching the terminal ends of the grating waveguides 142 are shifted by the difference. The light is diffracted and emitted from each grating waveguide 142, but the diffracted light beams pass through the emission-side slab waveguide 144 while interfering with each other and reach the incident ends of the emission-side waveguides 146. At this time, the interference light has the highest intensity at a position corresponding to the wavelength due to the phase shift. That is, the light beams having different wavelengths are sequentially incident on the emission-side waveguides 146, and the light is spatially dispersed. In other words, each of the emission-side waveguides 146 is formed such that each incident end is located at such a position that the light is divided in such a manner. Hereinafter, each light obtained by dividing the incident pulsed light and emitting the light from each of the emission-side waveguides 146 is referred to as divided pulsed light.

As shown in FIG. 8, a delay fiber 15 is connected to each of the emission-side waveguides 146. The delay fibers 15 are finally bundled into one fiber bundle. An emission end unit 16 is provided at an emitting end of the bundle fiber, and the object P is irradiated with the emitted light. The emission end unit 16 includes an element such as a collimator lens, and is a unit that irradiates the object P with beams of the pulsed light transmitted through the delay fibers 15 in an overlapping manner. Therefore, in this embodiment, the pulsed light is divided by the arrayed waveguide diffraction grating into divided pulsed light, and then collected and combined on the object P. It should be noted that "combined" includes a case where irradiation is performed in a temporally shifted manner, but irradiation is performed in a spatially overlapping manner in the object P. Furthermore, as will be described later, there is a case where the object P is irradiated during movement, and in this case, there may be a case where the light beams do not spatially overlap each other. However, there is no change in that the object P is irradiated with light that is originally one pulsed light, and thus, the expression is made in this manner. Hereinafter, the pulsed light that is combined is referred to as combined pulsed light.

Light beams having different wavelengths are sequentially incident on the delay fibers 15, but each delay fiber 15 has an appropriate length according to the wavelength of the incident light. The appropriate length is a length at which one-to-one correspondence between time and wavelength is achieved in the combined pulsed light. Length optimization often means a configuration in which each delay fiber has a different length depending on the wavelength of the incident light. In addition to the length, the material of each delay fiber 15 may be optimized. That is, the material may be different depending on the wavelength of the incident light. In any case, with such a configuration, the delay amount is optimized according to the wavelength, and $\Delta\lambda/\Delta t$ shown in FIG. 2 can be more uniform. That is, the wavelength resolution can be made uniform over the entire range of the measurement wavelength. In particular, this effect is remarkable when the wavelength resolution is made uniform over a wide wavelength range as in a configuration using SC light. In addition to making $\Delta\lambda/\Delta t$ uniform as described above, an arbitrary $\Delta\lambda/\Delta t$ can be realized by appropriately selecting the length and material of each delay fiber 15.

Also in the second embodiment, the output from each of the light receivers 2 and 52 is input to the calculator 3 via each of the AD converters 21 and 53 and each of the FPGAs 61 and 54 as the integration units 6 and 60, and conversion into a spectrum is performed after values at times that can be regarded as having the same wavelength are integrated. At this time, in the second embodiment, the integration in each of the FPGAs 61 and 54 is optimized in relation to the division of the pulsed light by the arrayed waveguide diffraction grating 14. This point will be described below.

Figure 9A:
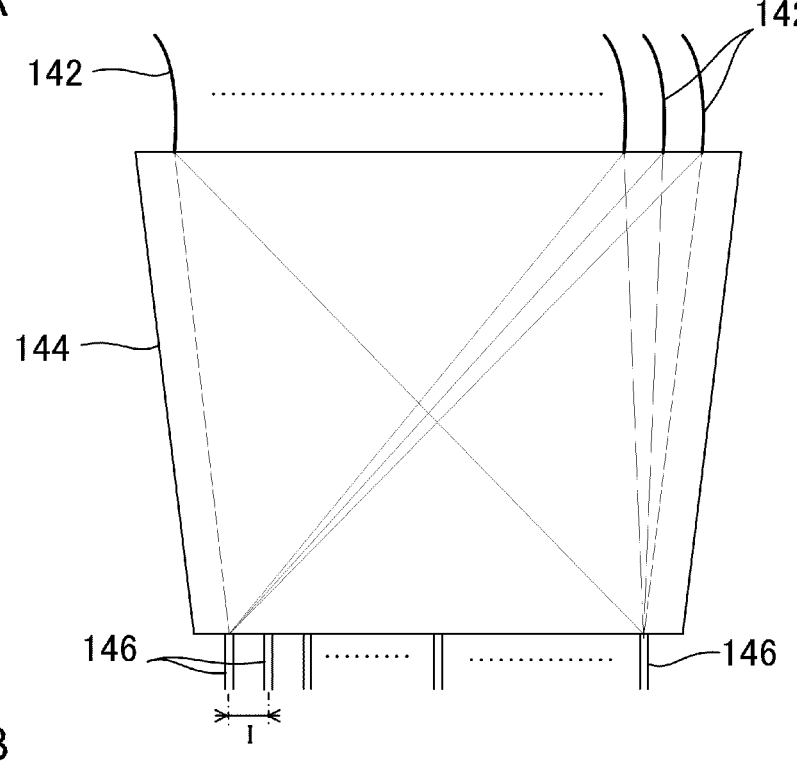
FIGS. 9A-9C are schematic diagrams showing light incident on an emission-side waveguide of the arrayed waveguide diffraction grating.
Figure 9B:
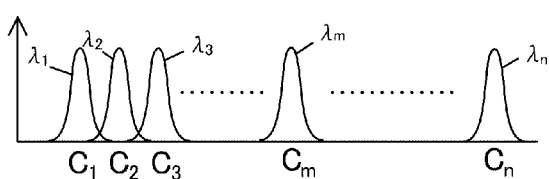
Figure 9C:
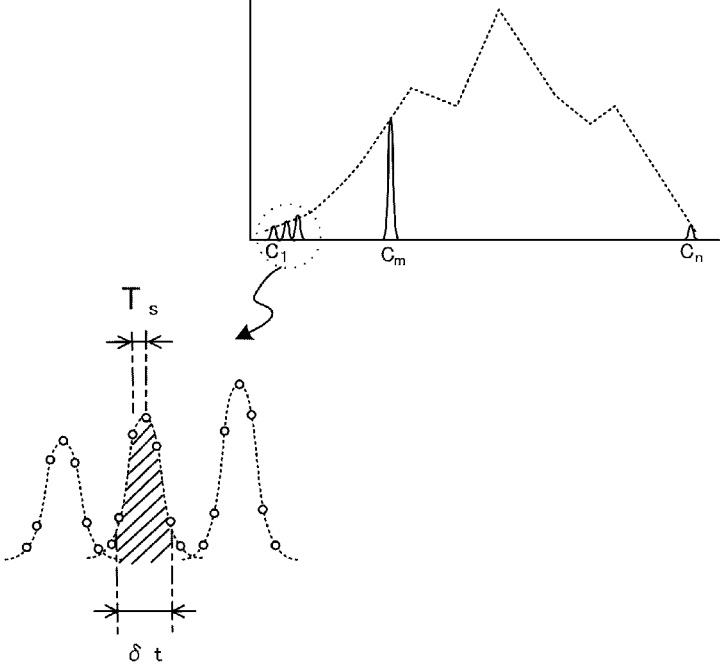

FIGS. 9A-9C are schematic diagrams showing light incident on the emission-side waveguide of the arrayed waveguide diffraction grating.

FIG. 9A schematically shows excerpted light reaching each of the emission-side waveguides 146 through the emission-side slab waveguide 144. In addition, FIG. 9B schematically shows the light intensity of each wavelength on the incident surface of each of the emission-side waveguides 146. Therefore, in FIG. 9B, the horizontal axis represents the position on the incident surface of each of the emission-side waveguides 146.

As shown in FIG. 9B, on the incident surface of the emission-side waveguide 146, the light of $\lambda_1$ is condensed in a certain limited range and has a peak at the center position, and the intensity outside the range is 0. The light of $\lambda_2$ peaks at a position adjacent thereto, and the intensity outside the range is zero. As described above, the peak position of the light up to $\lambda_n$ is sequentially shifted on the terminal end surface of the emission-side slab waveguide 144. Note that, in FIG. 9A, the end surface of the emission-side slab waveguide 144 is drawn flat, but is a surface having an arcuate cross section similarly to the terminal end surface of the incident-side slab waveguide 143.

In the configuration using the arrayed waveguide diffraction grating 14, the time group in which the pulse emitted from one emission-side waveguide 146 is detected is one channel, and all the signal intensities in the channel correspond to the intensity of one wavelength. That is, the wavelength resolution in the case of using the arrayed waveguide diffraction grating 14 is defined by the interval (indicated by I in FIG. 9A) of the incident end of the emission-side waveguide 146, and the outputs of the light transmitted through one channel may be time-integrated. As shown in an enlarged manner in FIG. 9C, in a case where a plurality of pieces of sampling is performed for the output of one channel and there is a plurality of pieces of digitized data, the plurality of pieces of digitized data is added to be the light intensity in the channel.

In this case, between the light of $\lambda_1$ and the light of $\lambda_2$, light beams having wavelengths therebetween sequentially exist with peaks. Therefore, light beams having wavelengths before and after $\lambda_1$ are also incident on the emission-side waveguide 146 on which the light of $\lambda_1$ is incident. That is, each of the emission-side waveguides 146 does not completely divide the wavelength, and wavelengths before and after $\lambda_1$ are mixed ($\lambda_1 \pm \Delta\lambda_1$). In this case, although the amount is small, wavelengths common to adjacent channels are included in $\pm\Delta\lambda_1$, and a so-called crosstalk state occurs.

Although the crosstalk is a factor that lowers the purity of the wavelength in the channel, it is possible to reduce the purity reduction of the wavelength due to the crosstalk by selecting an appropriate integration range. FIGS. 10A and 10B show this point, and are schematic diagrams showing crosstalk reduction by selecting an integration range.

The crosstalk occurs because, in the arrayed waveguide diffraction grating, an incident end of each of the emission-side waveguides has a certain width and each of the incident ends has a certain interval I. Hereinafter, a wavelength at which the intensity peaks at the center of the incident end of the emission-side waveguide 146 corresponding to a certain channel is referred to as a channel wavelength for the channel.

For example, as shown in FIG. 10A, in a case where I is narrow, in addition to light having the channel wavelength $\lambda_2$, light having the channel wavelengths $\lambda_1$ and $\lambda_3$ of the adjacent channels is slightly incident on the incident end of the emission-side waveguide 146 corresponding to the channel C2. When I is increased, as shown in FIG. 10B, the light having the channel wavelengths of the adjacent channels is not incident, but the light having the wavelengths common to the adjacent channels can be incident. For example, when an intermediate wavelength between $\lambda_1$ and $\lambda_2$ is $\lambda_{1.5}$, the light having the wavelength $\lambda_{1.5}$ can be incident little by little on the emission-side waveguide 146 corresponding to the channel C1 and on the emission-side waveguide 146 corresponding to the channel C2.

In FIGS. 10A and 10B, the horizontal axis represents a position on the terminal end surface of the emission-side slab waveguide 144, and represents a space. Light beams are spatially shifted, but temporally overlap wholly. These light beams are temporally shifted at the time of emission of the delay fibers 15 due to a difference in the amount of delay at the time of propagation in the delay fibers 15 connected to the emission-side waveguides 146. This state is shown in lower portions (A2-1) and (A2-2) of FIG. 10A, and lower portions (B2-1) and (B2-2) of FIG. 10B. Left lower portion (A2-1) of FIG. 10A and left lower portion (B2-1) of FIG. 10B show a case where the difference in the delay amount is small, and right lower portion (A2-2) of FIG. 10A and right lower portion (B2-2) of FIG. 10B show a case where the difference in the delay amount is large. In portions (A2-1), (A2-2) of FIG. 10A and portions (B2-1) and (B2-2) of FIG. 10B, the horizontal axis (axis line is omitted) represents time.

As shown in portions (A2-1), (A2-2) of FIG. 10A and portions (B2-1), (B2-2) of FIG. 10B, in a case where the difference in the delay amount is small, beams of the divided pulsed light temporally overlap at the skirt portion, but when the difference in the delay amount is increased, the beams of the divided pulsed light are completely separated temporally. In any of these cases, in the wavelength component of each divided pulsed light, not only the channel wavelength but also wavelengths before and after the channel wavelength are included in the skirt portion.

Such beams of the divided pulsed light are collected and radiated to the object P as combined pulsed light, and an output of the light receiver 2 is generated, and a temporal change thereof is also a pattern corresponding to portions (A2-1), (A2-2) of FIG. 10A, portions (B2-1), (B2-2) of FIG. 10B. Therefore, as shown in portion s (A2-1), (A2-2) of FIG. 10A, and portions (B2-1), (B2-2) of FIG. 10B, the integration is performed in the narrow time width δt excluding the skirt portion, so that the crosstalk can be eliminated and the purity of the wavelength can be increased.

In the above configuration, it is assumed that each divided pulsed light emitted from each delay fiber 15 is chirped pulsed light. Since the light is chirped pulsed light, a wavelength of crosstalk exists at a skirt portion of a pulse (time waveform), and the crosstalk can be reduced by excluding the wavelength. In order to obtain the chirped pulsed light, each delay fiber 15 needs to have a normal dispersion characteristic in the entire range of the wavelength of the divided pulsed light to be transmitted or an abnormal dispersion characteristic in the entire range.

In the second embodiment, the optimum range is set as described above, the values are integrated in each channel, and further integrated between pulses. That is, the value of the same channel is added to obtain the light intensity in the channel. That is, in the second embodiment, a configuration is adopted in which the value of each channel is obtained by integrating a plurality of pieces of sampling data, and the values are further integrated between pulses to obtain a data set ($v_1$ to $v_n$, $V_1$ to $V_n$), and each of the FPGAs 61 and 54 is programmed to perform such processing. In the above description, the integration processing between the pulses is performed after the integration processing in the channel, but the integration processing in the channel may be performed after the integration processing between the pulses is performed. In this case, the function of performing the integration processing in the channel may be implemented in the measurement program 33.

As can be seen from the above description, since the spectroscopic measurement apparatus of the second embodiment performs wavelength division using the arrayed waveguide diffraction grating 14 to cause a delay according to the wavelength and then performs combining in addition to the effects of speeding up the measurement and increasing the SN ratio, it is possible to obtain an effect that the wavelength resolution can be made more uniform over the entire range of the measurement wavelength. Then, the problem of crosstalk caused by the adoption of the arrayed waveguide diffraction grating 14 is excluded at the time of integration, and for this reason, the purity of the measurement value, that is, the reliability of the measurement value becomes higher.

Note that, in a case where the arrayed waveguide diffraction grating 14 is used, there may be a configuration in which there is only one piece of sampling data in one channel. For example, it is sufficient that the measurement can be performed over a wavelength range of 500 nm, and in a case where the necessary wavelength resolution is 5 nm, the number of channels is 100. Therefore, the number of channels in the arrayed waveguide diffraction grating 14 is also 100, and sufficient fabrication is possible as long as the number of channels is such a degree. In this case, if the length of the delay fiber 15 is designed so that the wavelength resolution in the sampling period is 5 nm, there is only one piece of sampling data in one channel, and time integration in the channel does not need to be performed.

Note that, in a case where there is a plurality of pieces of sampling data in one channel, in addition to a configuration in which data integration in the channel and data integration between pulses are performed, a configuration in which a peak value (sampling data having a maximum value) in the channel is specified and integration is performed between pulses may be adopted.

Figure 11A:
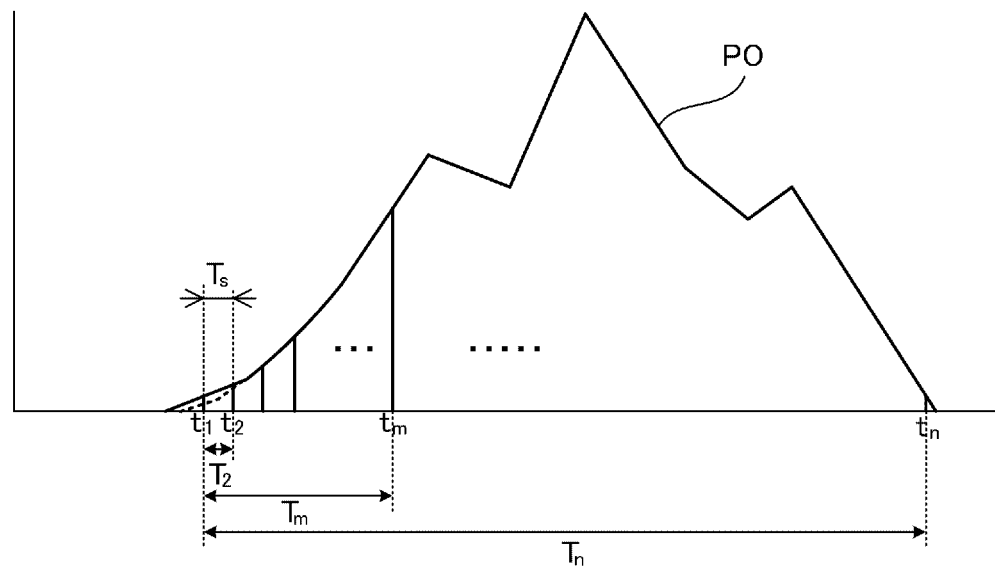
FIGS. 11A and 11B are schematic diagrams for describing another configuration of a reference time applying unit.
Figure 11B:
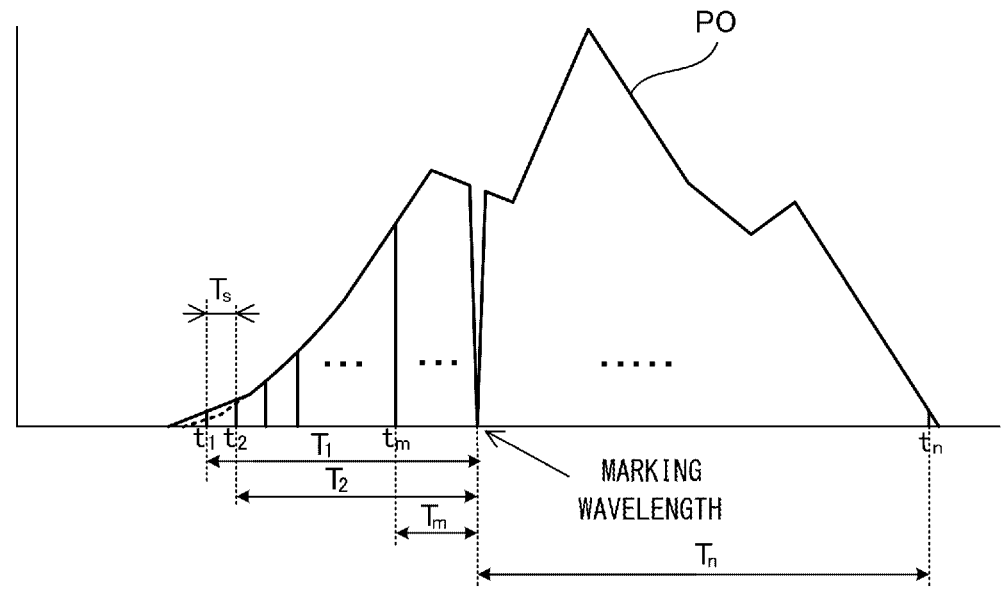

Next, another configuration of the reference time applying unit will be described with reference to FIGS. 11A and 11B. FIGS. 11A and 11B are schematic diagrams for describing another configuration of the reference time applying unit.

In each of the above embodiments, the reference time applying unit is the trigger signal generator 62 that generates the trigger signal in accordance with the emission of each pulsed light, but there may be other configurations. For example, the reference time applying unit may be configured to be internally provided in the integration unit 6. FIG. 11A shows this example. A certain pulse output PO from the light receiver 2 is indicated by a solid line.

The FPGA 61 as the integration unit 6 can determine whether a value effectively exceeding 0 is acquired first for the digital data for each sampling period output from the AD converter 21. The time at which it is determined that the value is acquired first is set as $t_1$, and the value of the "time that can be regarded as having the same wavelength" can be acquired based on $t_1$. Since the sampling period $T_s$ is constant in each pulsed light, the elapsed time from $t_1$ to $t_2$ in the first pulsed light is equal to the elapsed time from $t_1$ to $t_2$ in the next pulsed light, and the elapsed time from $t_1$ to $t_3$ in the first pulsed light is equal to the elapsed time from $t_1$ to $t_3$ in the next pulsed light. The same applies to $t_4$ and subsequent times, and the same applies to subsequent pulsed light.

Therefore, the FPGA 61 can obtain a similar effect only by determining $t_1$ for data by each pulsed light and simply integrating values having the same number of sampling periods (values having the same order) therefrom. This idea is based on the premise that $\Delta\lambda/\Delta t$ shown in FIG. 2 is the same in each pulsed light. Also in this case, when the nonlinear optical effect in the nonlinear element 12 or the pulse extension action in the extension element 13 varies among beams of the pulsed light, $\Delta\lambda/\Delta t$ changes, and thus the premise collapses. However, a change that affects the measurement accuracy does not actually occur, and $\Delta\lambda/\Delta t$ may be the same in each pulsed light. Note that $\Delta\lambda/\Delta t$ being the same means that $\Delta\lambda/\Delta t$ at a certain wavelength is the same in each pulsed light, and may be different between wavelengths in one pulsed light.

However, in the case of the method of FIG. 11A, as indicated by a broken line, if a change occurs in the rising way of the pulse between the first pulsed light and the next pulsed light, the measurement accuracy may be deteriorated. For example, in a case where $t_1$ is a wavelength of $\lambda_1$ in the first pulse and the pulse rises from this wavelength, whereas in the second pulsed light, the pulse rises from $\lambda_2$, $\lambda_2$ becomes $t_1$ in the second pulsed light, and thus, the intensity of $\lambda_2$ is added to the intensity of $\lambda_1$ and integrated (mistaken).

This example is an extreme example, but in any case, the time at which a value effectively exceeding 0 is first acquired is likely to be unstable because the value is small. In comparison with this, the configuration in which the trigger signal is generated along with the emission of the ultrashort pulsed laser light and the generated trigger signal is used as the reference time is preferable because the destabilization of the reference time can be avoided.

However, the deformation of the rise of the pulse as shown in FIG. 11A means that the broadening by the nonlinear element 12 is destabilized, but such destabilization rarely occurs in the measurement time on the order of milliseconds or on the order of ten milliseconds, and there are many cases where it is not necessary to consider it.

FIG. 11B is an example in which the reference time of the pulsed light is created by an external element, and is an example in which the external element serves as the reference time applying unit. In this example, although not shown, a marker element is disposed on an optical path on the emission side of the extension element 13. As the marker element, for example, a notch filter that selectively attenuates only a known wavelength can be used. A volume Bragg grating can also be used as a marker element. The volume Bragg grating is an optical element that refracts or reflects only light having a specific wavelength in a different direction. Hereinafter, a wavelength selected in these marker elements is referred to as a marking wavelength. In the notch filter, a wavelength to be selectively attenuated is a marking wavelength, and in the volume Bragg grating, a wavelength of light to be selectively refracted or reflected is a marking wavelength.

When the marker element is disposed, the light having the marking wavelength is remarkably reduced also in the pulsed light incident on the light receivers 2 and 52, so that the time at which the light having the marking wavelength is incident can be specified. That is, as shown in FIG. 11B, in a certain pulse output PO, when only specific data is 0 or a value close to 0 in the middle of the pulse, the time at which the data is acquired can be regarded as the time at which the light having the marking wavelength reaches the light receiver 2. Then, integration of adding the data of the same order is performed based on the time. That is, data of the marking wavelength is specified for each pulsed light, and each data is specified as follows: first, minus first, second, minus second, third, minus third, . . . . Then, for each pulsed light, integration is performed in which the first value is added, the minus first value is added, the second value is added, the minus second value is added, . . . the same order of the value before and after the value is added. Since the sampling period is also constant here, values at times at which the elapsed time (plus or minus) in the pulse can be regarded as the same are added. Also in this method, it is based on the premise that $\Delta\lambda/\Delta t$ is constant in each pulsed light.

In the case of using the marker element, even if the rise of the pulse is deformed as shown in FIG. 11A, this does not affect the correspondence between time and wavelength, and the reliability of measurement does not decrease. For example, it is assumed that the earliest time $t_1$ existing in the first pulse output PO is the k-th time from the time of the sampling wavelength. In this case, there may be no k-th time in the second pulse due to the change in the rise, but in this case, the value in the first pulse output is directly followed and integrated, or the FPGAs 61 and 54 can be programmed to exclude the k-th channel itself as invalid. Note that, in a case where a marker element is used, a measurement result cannot be obtained at a portion of a marking wavelength (missing of a spectrum occurs). Therefore, in this respect, the method of FIG. 11A or the method using the trigger signal generator 62 is more preferable.

In addition, the marker element may also be used to apply an absolute value of a wavelength in the correspondence of time to wavelength. That is, $\Delta\lambda/\Delta t$ shown in FIG. 2 is checked in advance, and the absolute value of the wavelength at each time is specified in relation to the time at which the light having the marking wavelength is received.

In addition to the case of using the marker element, when the spectrum of the broadband pulsed light originally has a characteristic point, the characteristic point can be used as a mark (marker wavelength). For example, in the case of pulsed light in which ultrashort pulsed laser light is broadened by a nonlinear element, the wavelength of the ultrashort pulsed laser light may remain with high intensity, and the intensity of this wavelength may protrude in a ripple shape. This can be used as a marker wavelength. In this case, in the data set by each pulsed light, data having a particularly high value is assumed to be data of the marker wavelength, and the pieces of data of the same order before and after the data are integrated.

Next, another example of the integration units 6 and 60 will be described.

In each of the above embodiments, the integration units 6 and 60 are the FPGAs 61 and 54 and are realized by hardware, but can also be realized by software. For example, the integration units 6 and 60 can be implemented as one module of the measurement program 33. In this case, the data sets $v_1$ to $v_n$ and $V_1$ to $V_n$ sampled for individual beams of the pulsed light are temporarily stored in the memory. Then, an integrated value is acquired by adding the pieces of data of the same order, and then an absorption spectrum is calculated by comparing each integrated measurement value with each integrated reference intensity.

In the case of being realized by software as described above, hardware such as the FPGAs 61 and 54 is unnecessary, but since it is necessary to write and read data with a large volume and perform calculation (addition), there is a disadvantage that processing takes time. The hardware such as the FPGAs 61 and 54 is suitable because high-speed processing can be performed. Note that it is also possible to adopt an ASIC as the integration units 6 and 60.

Figure 12:
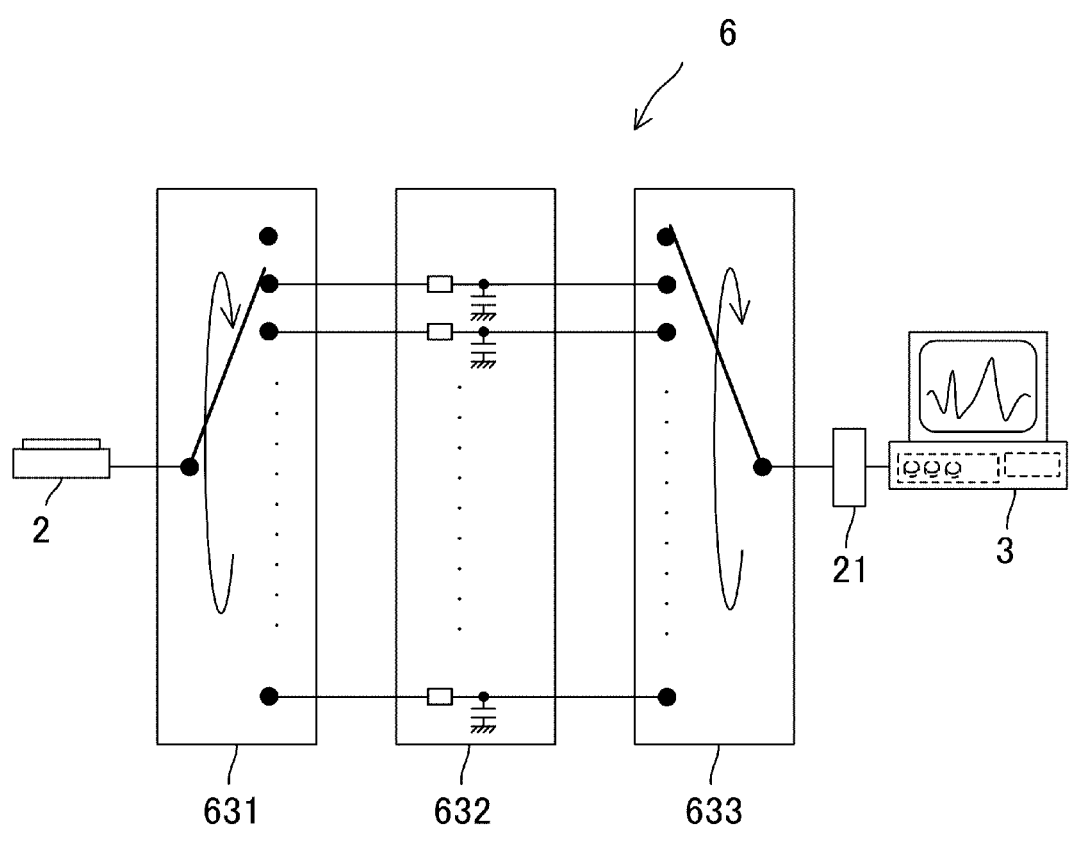
FIG. 12 is a schematic diagram showing an example of the integration unit that performs integration in a state of analog data.

In addition, as the configuration of the integration units 6 and 60, a configuration in which integration is performed in a state of analog data can also be adopted. An example of this is shown in FIG. 12. FIG. 12 is a schematic diagram showing an example of the integration unit 6 that performs integration in a state of analog data.

The integration unit 6 shown in FIG. 12 is a circuit unit disposed between the light receiver 2 and the AD converter 21. This circuit unit includes a time division switch 631 that time-divides the output from the light receiver 2, an integrator 632 that integrates the analog output (voltage) in each time zone divided by the time division switch 631, and a reading switch 633 that sequentially selects and outputs each integration circuit in the integrator 632.

In the integrator 632, integration circuits of a number corresponding to the number of data (the number of channels) in one pulsed light are provided in parallel. The time division switch 631 is a circuit element that sequentially connects the analog output from the light receiver 2 to each integration circuit by switching the analog output for each sampling period. The reading switch 633 is a circuit element that sequentially connects each integration circuit to the AD converter 21 and reads an integrated value when a readout command is input after irradiation of a predetermined number of beams of pulsed light is finished.

The AD converter 21 digitizes the integrated value in each integration circuit and inputs the value to the calculator 3. The processing in the calculator 3 is similar to the above. For the output from the reference light receiver 52, the integration unit 60 can have a similar analog integration configuration.

Next, embodiments of the inventions of a product inspection device, a product inspection method, and a product sorting device will be described.

Figure 13:
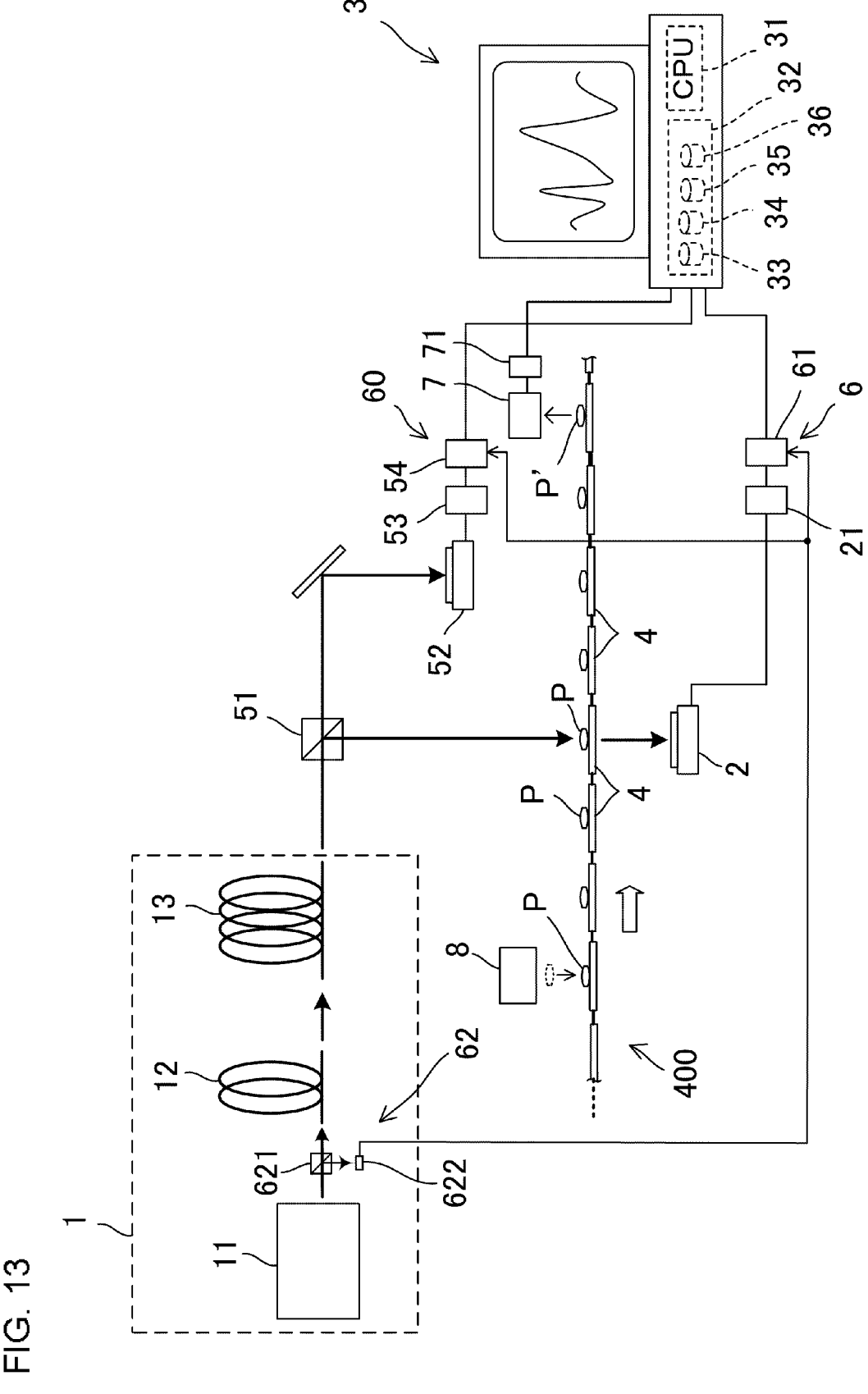
FIG. 13 is a schematic diagram of a product inspection device according to the embodiment.

FIG. 13 is a schematic diagram of the product inspection device according to the embodiment. The product inspection device shown in FIG. 13 has the configuration of the spectroscopic measurement apparatus described above, and is a device that determines the quality of a product P according to the result of the spectroscopic measurement. The product inspection device includes an exclusion mechanism 7 that excludes a product P determined to be a defective product from the manufacturing line. Therefore, the following description of the product inspection device is also a description of the embodiment of the invention of the product sorting device.

The product inspection device shown in FIG. 13 is a device adopting the configuration of the spectroscopic measurement apparatus of the first embodiment. The product inspection device includes a quality determination program 34 in the calculator 3.

A sequence control program 35 for controlling a product inspection sequence is implemented in the calculator 3. That is, the calculator 3 is also used as a controller that controls the entire device. The sequence control program 35 is programmed to execute the measurement program 33 and then execute the quality determination program 34 using an absorption spectrum as a result thereof as an argument.

Figure 14:
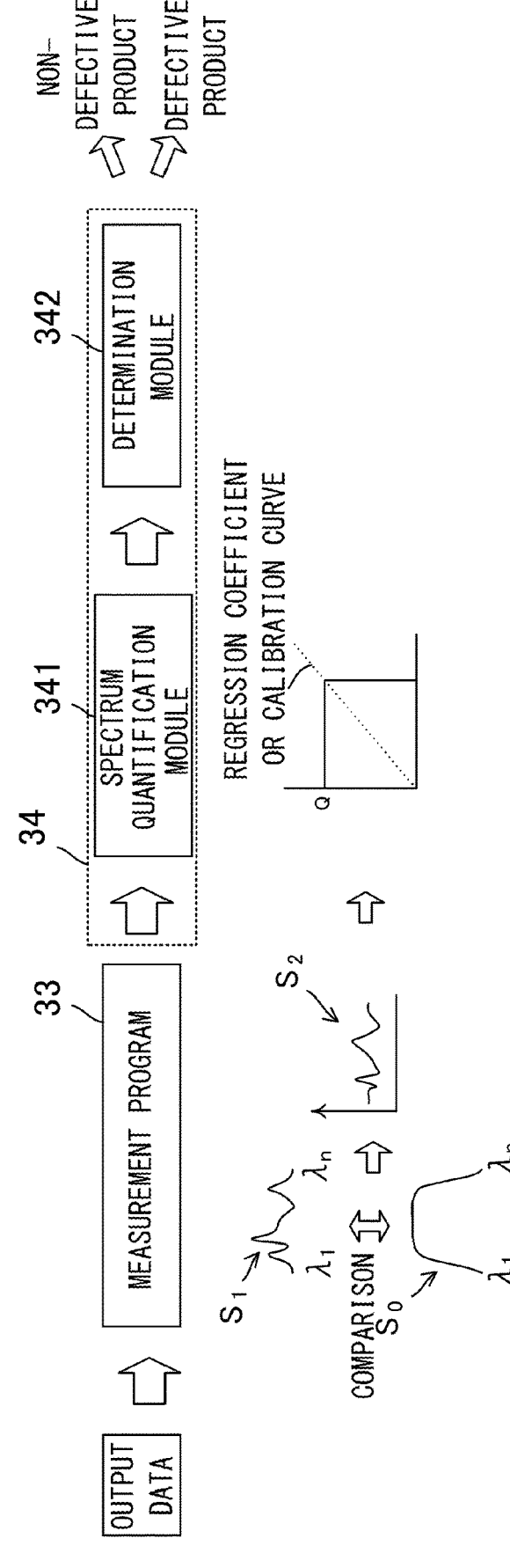
FIG. 14 is a diagram schematically showing a quality determination program constituting a determiner.

FIG. 14 is a diagram schematically showing the quality determination program 34 constituting a determiner. As shown in FIG. 14, the quality determination program 34 includes a spectrum quantification module 341 and a determination module 342. As described above, the measurement program 33 compares as a measurement spectrum $S_1$, which is the integrated output data, with a reference spectral intensity $S_0$, which is the similarly integrated output data, and calculates an absorption spectrum $S_2$. Then, the quality determination program 34 is executed using the calculated absorption spectrum $S_2$ as an argument. In the quality determination program, the spectrum quantification module 341 is a module that obtains an amount (hereinafter, referred to as a quantitative value) Q that can be compared with the reference value based on the absorption spectrum $S_2$. The determination module 342 is a module that compares the calculated quantitative value Q with the reference value, performs quality determination, and outputs the result as a program execution result.

The absorption spectrum $S_2$ passed as an argument is a sum of absorption spectra of respective components contained in the product P. It is also possible to determine the quality of the product P by the amount of all the contained components, but since it is too complicated, the quality is determined by the amount of a specific component. A specific component is a component that has the largest influence on the quality of the product P or a component the amount of which is the largest in the product P. In the case of a pharmaceutical product, the quality may be determined by the amount of an active ingredient. As described above, it is preferable to determine the quality by focusing on the meaningful component in the product.

In any case, in this embodiment, the quality is determined by the absorption spectrum $S_2$ in the near-infrared range. As is well known, in the near-infrared range, absorption bands of many materials overlap each other, and it is difficult to directly obtain the amount of the target component from the calculation result of the absorption spectrum. For this reason, the spectrum quantification module 341 adopts a chemometrics method.

As chemometrics, techniques such as principal component analysis (PCA), principal component regression analysis (PCR), and partial least square regression (PLS regression) (PLSR) analysis are known. Although any method can be adopted, a case where PLSR is performed will be described as an example.

In the case of performing PLSR, measurement is similarly performed for a large number of samples (products P) in which the amount of the target component is known, and data sets are obtained. Then, regression analysis is performed based on a large number of the obtained data sets to obtain a regression coefficient. In actual quantitative determination, the amount of the target component is predicted using the obtained regression coefficient, and the predicted value is set as a quantitative value.

PLSR is a technique developed from PCA and PCR, and first, principal component analysis is performed. That is, as represented by the following Formula 1, multivariate data X (here, an absorption spectrum measured for a sample whose target component amount is known) is decomposed into a principal component score T, a loading vector R, and a residual E.

$$X=TR+E \tag{1}$$

In PLSR, principal component analysis is performed on the multivariate data X, and regression analysis is performed using the value of the principal component score T obtained in the principal component analysis in order to avoid collinearity. At this time, only a portion related to the amount of the principal component in the spectrum data set X is extracted, and the regression coefficient is obtained by the least squares method. Then, a calibration curve is created according to the regression coefficient thus obtained. Since PLSR and other chemometrics are explained in Non Patent Literature 1 and other documents, further explanation is omitted.

As shown in FIG. 14, the quality determination program 34 executes the determination module 342 after executing the spectrum quantification module 341. The determination module 342 is a module that compares the quantitative value Q obtained by the spectrum quantification module 341 with the reference value and determines quality. The reference value and the tolerance of the deviation from the reference value are given as constants to the determination module 342. The determination module 342 determines the quality according to these, and outputs the result as an execution result of the quality determination program 34.

The amount Q of the target component may be a ratio (content ratio) to the whole, or may be an absolute value (content). In the case of calculating the absolute value, a calibration curve is prepared so that the absolute value can be calculated, or in the case of the weight ratio, the weight of the product P is separately measured and calculated.

In addition, in practice, the output data D is subjected to preprocessing such as smoothing or secondary differentiation, and thereafter, the quantitative value Q is acquired by applying the regression coefficient obtained by PLSR. At this time, wavenumber domain selection is performed to extract only a portion related to the target component, and the quantitative value Q is then acquired.

The product inspection device according to the embodiment is a device that determines the quality of the product P in real time in the manufacturing line of the product P. "In real time" means that the quality is determined on the spot where the product P is manufactured, and does not means a configuration in which the quality of the product P is determined later by taking the product P to another place, dissolving the product P in a solution, and analyzing the product P with an analyzer such as HPLC.

As shown in FIG. 13, the product inspection device similarly irradiates the receiving jig 4 with the pulsed light in a state where the product P is held, and includes a moving mechanism 400 that moves the receiving jig 4 in order to sequentially determine the quality of a large number of products P.

The receiving jigs 4 have a plate shape, are arranged in the horizontal direction, and are connected to each other. The moving mechanism 400 is a mechanism that moves the receiving jigs 4 in the direction in which the receiving jigs 4 are arranged. For example, when a horizontal direction perpendicular to the moving direction is left and right, a configuration in which a linear guide is provided on one of the left and right sides and a linear drive source such as a linear motor is provided on the other side may be adopted. The receiving jigs 4 are connected to each other and linearly move while being guided by the linear guide by the linear drive source.

When the moving mechanism 400 moves, the receiving jigs 4 are sequentially positioned at the irradiation positions of the pulsed light, and the product P is irradiated with the pulsed light, and the quality determination is performed as described above. On the movement path on the upstream side of the irradiation position, a placement mechanism 8 for placing the products P one by one on each receiving jig 4 is provided. As the placement mechanism 8, for example, a robot including an arm that sucks the product P at the tip end and transfers the product P can be used.

The exclusion mechanism 7 is provided downstream of the irradiation position. The exclusion mechanism 7 is a mechanism that excludes the product P determined to be a defective product from the manufacturing line and prevents the product P from being shipped. The exclusion mechanism 7 is provided with an exclusion controller 71, and an output signal from the calculator 3 is input to the exclusion controller 71.

An exclusion signal output program 36 is implemented in the calculator 3. The sequence control program 35 is programmed to execute the exclusion signal output program 36 when a result indicating that the product P is a defective product is returned as the execution result of the quality determination program 34. The exclusion signal output program 36 is a program that outputs a signal to the exclusion controller 71 to operate the exclusion mechanism 7.

As the exclusion mechanism 7, a robot that similarly sucks the product P at the tip end, picks up the product P from the receiving jig 4, and puts the product P into a disposal box (not shown) can be adopted. Note that the exclusion controller 71 is configured so that the exclusion mechanism 7 operates at the timing when the receiving jig

4 at the irradiation position (quality determination position) reaches the exclusion position in the exclusion mechanism 7.

Hereinafter, an operation of the product inspection device will be described also as description of the embodiment of the product inspection method.

The manufactured products P are placed one by one on the receiving jigs 4 by the placement mechanism 8. Each receiving jig 4 on which the product P is placed is moved by the moving mechanism 400 and reaches the irradiation position. At the irradiation position, the product P is irradiated with pulsed light multiple times. Then, the light transmitted through the product P at the time of the irradiation reaches the light receiver 2 and generates an output of the light receiver 2. The output of the light receiver 2 is converted into digital data by the AD converter 21, integrated by the FPGA 61 as the integration unit 6, and input to the calculator 3. The output of the reference light receiver 52 is similarly digitized and integrated, and is input to the calculator 3.

In the calculator 3, the measurement program 33 calculates the absorption spectrum S$_2$, and the quality determination program 34 to which the absorption spectrum S$_2$ is passed determines the quality of the product P. When the execution result indicating that the product P is a defective product is returned, the sequence control program 35 executes the exclusion signal output program 36, and the exclusion mechanism 7 excludes the product P from the manufacturing line. In this manner, quality determination is sequentially performed on the products P on the receiving jigs 4, and the products P determined to be defective products are excluded.

In the product inspection, the receiving jig 4 may be stopped or moved when the pulsed light is radiated multiple times. As described above, for example, even if pulsed light having a repetition frequency of 10 kHz is emitted 100 times, the time required for the irradiation is milliseconds, and it is easy to emit pulsed light 100 times during movement as long as a product P that is very small is not moved at a high speed.

However, in the case of irradiating the product P with pulsed light multiple times while moving the product P, strictly, spectral characteristics of different portions on the product P are measured. Therefore, in a case where it is desired to strictly measure only the spectral characteristic of a specific portion, the product P is stopped. On the other hand, in the case of irradiating the product P with the pulsed light multiple times while moving the product P, the spectral characteristics of the product P are measured at a plurality of different portions and integrated. This means that the average of the spectral characteristics in the product P is measured, and the average of the entire spectral characteristics can be instantaneously measured for the product P in which the spectral characteristics vary depending on the location, which is suitable in this respect.

Note that it is possible to perform spectroscopic measurement by irradiating the same portion with pulses multiple times while moving the product P. Specifically, a scanning mechanism such as a galvanometer mirror may be provided in the optical system that radiates the pulsed light, and the irradiation position of the pulsed light may be scanned in synchronization with the movement of the product P.

In the above embodiment, it is not essential to quantify the specific component in order to determine the quality of the product P. For example, there is a characteristic wavelength in the spectral absorption characteristics of the product P, and the quality may be determined only by the value. In this case, the value of the wavelength is compared with the reference value from the absorption spectrum to determine the quality. Since only a specific wavelength is required, it is not necessary to obtain a spectrum (a value at each wavelength over a certain wavelength range). The quality can be determined only by dividing the measurement value at the wavelength by the reference intensity and comparing the result with the reference value.

In the device and the method of each of the above embodiments, the light from the object P when the pulsed light is radiated multiple times is the transmitted light, but may be reflected light or scattered light. In the case of performing the spectroscopic measurement of the reflected light and the scattered light, the light receiver 2 is disposed at a position to receive the reflected light and the scattered light. In addition, the reference spectral intensity is obtained by disposing a standard plate having known spectral reflection characteristics and spectral scattering characteristics instead of the receiving jig 4 and performing measurement. When it is desired to obtain the reference spectral intensity in real time, such a standard plate is provided on the reference optical path, and reflected light and scattered light thereof are received by the reference light receiver 52.

Although the description of the type of the product P is omitted, various products other than the above-described tablet can be set as the object to be inspected. For example, it can be used for inspection of oral products such as various health foods other than the tablet. In addition, industrial products manufactured by various molding techniques can also be inspected.

A solid phase is not essential, and a liquid phase product can also be inspected. For example, in the case of a medicine, there is an example in which the manufactured liquid-phase medicine is placed in a transparent container and irradiated with pulsed light through the container to inspect quality.

Furthermore, as the pulsed light source 1, in addition to one that includes the ultrashort pulsed laser source 11 and emits SC light by the nonlinear element 12, a configuration that includes an amplified spontaneous emission (ASE) light source, a superluminescent diode (SLD) light source, and the like, in which light from any of these light sources is extended by the extension element 13 may be adopted. Since the ASE light source is light generated in the fiber, when the fiber is used as the extension element 13, the ASE light source has high affinity, can cause broadband pulsed light to be incident on the extension element 13 with low loss, and can extend the broadband pulsed light with high efficiency. In addition, since also the SLD light source extracts light emission in a narrow active layer, it is possible to cause broadband pulsed light to be incident on the extension element 13 with low loss, and to extend the broadband pulsed light with high efficiency.

Advantageous Effects of Disclosure

As described below, according to the spectroscopic measurement method or the spectroscopic measurement apparatus according to the disclosed invention, the spectroscopic measurement is performed by irradiating the object with the pulsed light in which the elapsed time and the wavelength of light correspond to each other on a one-to-one basis, and thus, it is possible to realize the spectroscopic measurement at a very high speed. In addition, since the measurement result is obtained by integrating the values at times at which the same wavelength is regarded as being received, a high SN ratio is also achieved at the same time. In order to increase the SN ratio, it is necessary to radiate pulsed light multiple times, but by sufficiently increasing the repetition frequency of the pulsed light, the influence on the high-speed measurement can be made substantially zero.

In addition, in a case where the reference time is given at the time of integration and the reference time is a trigger signal generated along with the emission of each pulsed light in the pulsed light source, when the output of the light receiver by each pulsed light is integrated, it is not necessary to formulate the reference time in the output data, and integration can be performed at high speed.

In addition, in the configuration in which the trigger signal is generated by detecting the ultrashort pulsed laser light before being incident on the nonlinear element, since the trigger signal is stably obtained, it is possible to prevent mistaking of a wavelength at the time of integration, and measurement accuracy is increased in this respect.

In addition, in the configuration in which the broadband pulsed light emitted from the nonlinear element is wavelength-divided by the arrayed waveguide diffraction grating, each wavelength is transmitted by each appropriate delay fiber, and integration is performed in units of channels of the arrayed waveguide diffraction grating, the wavelength resolution can be made more uniform over the entire measurement wavelength range, and the SN ratio can be further improved.

At this time, each of the delay fibers has a normal dispersion characteristic or an abnormal dispersion characteristic in a wavelength range of each of beams of the incident divided pulsed light, and when a pulse output from the light receiver corresponding to each of beams of the divided pulsed light is to be integrated in a narrow width excluding skirt portions on both sides of the pulse, crosstalk can be excluded, so that the purity of the measurement value, that is, the reliability of the measurement value is further improved.

In addition, according to the product inspection method or the product inspection device that performs such spectroscopic measurement on a product and determines the quality of the product based on the result, it is possible to determine the quality of the product flowing through the manufacturing line in real time since the spectroscopic measurement is performed at a high speed and a high SN ratio, and it is also possible to inspect all the products. The present invention can also be applied to a product requiring particularly high quality such as a tablet as a pharmaceutical product.

In addition, in the configuration in which the quality is determined after the specific component is quantified by measuring the absorption spectrum of the product, the quality determination can be performed by selecting a component whose quality is easily determined or by selecting a particularly important component in the product, so that the accuracy of the determination and the significance of the determination can be further increased.

In addition, according to the configuration in which a product having an average transmittance of less than 10% is integrated by irradiating the product with pulsed light 100 times or more, it is possible to perform real-time quality determination on a product that is conventionally considered to be impossible to perform inspection by real-time spectroscopic measurement.

Further, according to the invention of the product selection apparatus including the exclusion mechanism structured to exclude the product determined to be a defective product from the manufacturing line, it is possible to effectively prevent the defective product from being shipped by utilizing the real-time property of the inspection. Therefore, it greatly contributes to improvement of reliability of the product.

What is claimed is:

1. A spectroscopic measurement method for measuring a spectrum of an object, the spectroscopic measurement method comprising:

an irradiation step of irradiating the object with first pulsed light multiple times in which an elapsed time in the first pulsed light and a wavelength of light correspond to each other on a one-to-one basis;

a light receiving step of receiving, by a light receiver, second pulsed light that is reflection light or transmission light generated from the object in response to irradiations of the first pulsed light in the irradiation step, wherein the light receiver does not receive the first pulsed light; and a calculation processing step of calculating the spectrum of the object based on output from the light receiver, wherein the calculation processing step includes:

for respective wavelengths, integrating output values of the light receiver at times at which it is regarded that the light receiver receives light having a same wavelength; and determining an intensity at each wavelength in the spectrum of the object based on the respective integrated output values.

2. The spectroscopic measurement method according to claim 1, further comprising a reference time applying step of applying a reference time to integrating the output values, wherein the reference time is used to specify the times at which it is regarded that light having the same wavelength is received by the light receiver.

3. The spectroscopic measurement method according to claim 2, wherein the reference time applying step includes a step of generating a trigger signal in accordance with emission of each of beams of the first pulsed light, and wherein integrating the output values includes integrating values of the output of the light receiver at times at which elapsed times from the trigger signal are the same.

4. The spectroscopic measurement method according to claim 3, wherein the irradiation step includes steps of causing ultrashort pulsed laser light from an ultrashort pulsed laser source to be incident on a nonlinear element to generate a nonlinear effect, so that the ultrashort pulsed laser light is broadened, causing the broadband pulsed light emitted from the nonlinear element to be incident on an extension element to extend a pulse width, and irradiating the object multiple times, and wherein the reference time applying step includes a step of detecting the ultrashort pulsed laser light before being incident on the nonlinear element and generating the trigger signal.

5. The spectroscopic measurement method according to claim 1, wherein, in the irradiation step, ultrashort pulsed laser light from an ultrashort pulsed laser source is made incident on a nonlinear element to generate a nonlinear effect, so that the ultrashort pulsed laser light is broadened, the broadband pulsed light emitted from the nonlinear element is wavelength-divided by an arrayed waveguide diffraction grating, and then divided pulsed light that is the broadband pulsed light having been wavelength-divided is transmitted through delay fibers to be delayed, and beams of the divided pulsed light emitted from the delay fibers are collected and radiated to an object as combined pulsed light, and a material and a length of each of the delay fibers are selected such that an elapsed time in the combined pulsed light and a wavelength of light correspond to each other on a one-to-one basis, and wherein integrating the output values includes a step of integrating each of values corresponding to each channel in the arrayed waveguide diffraction grating for outputs from the light receiver that has received light from the object irradiated with the combined pulsed light.

6. The spectroscopic measurement method according to claim 5, wherein each of the delay fibers has a normal dispersion characteristic or an abnormal dispersion characteristic in a wavelength range of each of beams of the incident divided pulsed light, and wherein integrating the output values includes a step of integrating a pulse output from the light receiver corresponding to each of beams of the divided pulsed light in a narrow width excluding skirt portions on both sides of the pulse.

7. A product inspection method comprising:

a spectroscopic measurement step of performing the spectroscopic measurement method according to claim 1 using a manufactured product as the object; and a quality determination step of determining quality of the product according to a result of the spectroscopic measurement in the spectroscopic measurement step.

8. The product inspection method according to claim 7, wherein the spectroscopic measurement step includes a step of measuring an absorption spectrum of a product as the object, wherein the product inspection method includes a quantification step of quantifying a specific component of the product from the measured absorption spectrum, and wherein the quality determination step includes a step of determining quality of the product from an amount of the specific component obtained in the quantification step.

9. The product inspection method according to claim 7, wherein the spectroscopic measurement step includes a step of measuring an absorption spectrum of a product as the object, wherein the product as the object has a transmittance of the first pulsed light at a wavelength average of less than 10%, wherein the irradiation step includes a step of irradiating the same product as the object with the first pulsed light 100 times or more, and wherein the integration step includes a step of integrating values at times at which light having the same wavelength is regarded as being received for the first pulsed light emitted 100 times or more.

10. The product inspection method according to claim 7, wherein the irradiation step is a step of irradiating the same product as the object with the first pulsed light multiple times.

11. A spectroscopic measurement apparatus for measuring spectrum of an object, the spectroscopic measurement apparatus comprising:

a pulsed light source structured to emit first pulsed light in which an elapsed time in the pulsed light and a wavelength of light correspond to each other on a one-to-one basis, wherein the object is irradiated with the first pulsed light multiple times;

a light receiver disposed at a position to receive second pulsed light that is reflection light or transmission light generated from the object in response to irradiations of the first pulsed light, wherein the light receiver does not receive the first pulsed light; and a calculator structured to convert an output from the light receiver into a spectrum, wherein the spectroscopic measurement apparatus further includes an integration unit structured to integrate values of the output of the light receiver at times at which it is regarded that the light receiver receives light having a same wavelength while the object is irradiated with the first pulsed light multiple times by the pulsed light source, and wherein the calculator is structured to determine an intensity at each wavelength in the spectrum of the object based on the respective integrated output values.

12. The spectroscopic measurement apparatus according to claim 11, wherein the integration unit is provided with a reference time applying unit structured to apply a reference time which is used to specify the times at which it is regarded that the light receiver receives light having the same wavelength.

13. The spectroscopic measurement apparatus according to claim 12, wherein the reference time applying unit is a trigger signal generator structured to generate a trigger signal in accordance with emission of each of beams of the first pulsed light in the pulsed light source, wherein the trigger signal generator is connected to the integration unit such that the trigger signal is input to the integration unit, and wherein the integration unit is structured to integrate values at times at which elapsed times from the trigger signal are the same for outputs from the light receiver that has received beams of the second pulsed light.

14. The spectroscopic measurement apparatus according to claim 13, wherein the pulsed light source includes an ultrashort pulsed laser source, a nonlinear element structured to generate a nonlinear effect in ultrashort pulsed laser light from the ultrashort pulsed laser source to broaden the ultrashort pulsed laser light, and an extension element structured to extend a pulse width of the broadband pulsed light emitted from the nonlinear element, and wherein the trigger signal generator includes a detector structured to detect the ultrashort pulsed laser light before being incident on the nonlinear element to generate the trigger signal.

15. The spectroscopic measurement apparatus according to claim 11, wherein the pulsed light source includes an ultrashort pulsed laser source, a nonlinear element that generates a nonlinear effect in ultrashort pulsed laser light from the ultrashort pulsed laser source to broaden the ultrashort pulsed laser light, an arrayed waveguide diffraction grating that wavelength-divides the broadband pulsed light emitted from the nonlinear element, and delay fibers structured to transmit and delay the divided pulsed light that is the pulsed light having been wavelength-divided by the arrayed waveguide diffraction grating, and a material and a length of each of the delay fibers are selected such that an elapsed time in the combined pulsed light and a wavelength of light correspond to each other on a one-to-one basis when beams of the divided pulsed light emitted from the delay fibers are collected and radiated to an object as the combined pulsed light, and wherein the integration unit is structured to integrate an output from the light receiver that has received light from the object irradiated with the combined pulsed light for each value corresponding to each channel in the arrayed waveguide diffraction grating.

16. The spectroscopic measurement apparatus according to claim 15, wherein each of the delay fibers has a normal dispersion characteristic or an abnormal dispersion characteristic in a wavelength range of each of beams of the incident divided pulsed light, and wherein the integration unit is structured to integrate a pulse output from the light receiver corresponding to each of beams of the divided pulsed light in a narrow width excluding skirt portions on both sides of the pulse.

17. A product inspection device comprising the spectroscopic measurement apparatus according to claim 11 that spectrally measures a manufactured product as the object, the product inspection device further comprising a quality determiner structured to determine quality of the product according to a result of the spectroscopic measurement obtained by the calculator.

18. The product inspection device according to claim 17, wherein the light receiver is provided at a position to receive light transmitted through the product as the object, and the calculator is structured to obtain an absorption spectrum of the product as a measurement result, wherein the product inspection device includes a quantification unit structured to quantify a specific component of the product from the measured absorption spectrum, and wherein the quality determiner is structured to determine the quality of the product from an amount of the specific component obtained by the quantitative unit.

19. The product inspection device according to claim 17, wherein the pulsed light source is a light source that irradiates the same product as the object with the first pulsed light 100 times or more, and wherein the integration unit is structured to integrate respective values at respective times at which light having the same wavelength is regarded as being received for the first pulsed light radiated 100 times or more.

20. The product inspection device according to claim 17, further comprising a moving mechanism that moves a product through an irradiation position of light from the pulsed light source, wherein the pulsed light source is a light source capable of irradiating the same product moving through the irradiation position with the first pulsed light multiple times.

21. A product sorting device comprising the product inspection device according to claim 17, the product sorting device comprising an exclusion mechanism structured to exclude a product determined to be a defective product by the quality determiner from a manufacturing line.

* * * * *